(12) United States Patent
Honda

(10) Patent No.: US 10,892,459 B2
(45) Date of Patent: Jan. 12, 2021

(54) BATTERY

(71) Applicant: Panasonic Intellectual Property Management Co., Ltd., Osaka (JP)

(72) Inventor: Kazuyoshi Honda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

(21) Appl. No.: 15/484,633

(22) Filed: Apr. 11, 2017

(65) Prior Publication Data
US 2017/0309884 A1    Oct. 26, 2017

(30) Foreign Application Priority Data
Apr. 25, 2016 (JP) ................. 2016-086780

(51) Int. Cl.
*H01M 2/20* (2006.01)
*H01M 10/04* (2006.01)
(Continued)

(52) U.S. Cl.
CPC ............ *H01M 2/204* (2013.01); *H01M 2/021* (2013.01); *H01M 2/024* (2013.01);
(Continued)

(58) Field of Classification Search
CPC ........ H01M 10/0413; H01M 10/0418; H01M 10/0436; H01M 10/044; H01M 10/0525; H01M 10/0562; H01M 2004/027; H01M 2004/028; H01M 2300/0068; H01M 2/021; H01M 2/0215; H01M 2/024; H01M 2/204; H01M 2/206; H01M 2/24; H01M 2/30;
(Continued)

(56) References Cited

U.S. PATENT DOCUMENTS

2004/0072078 A1    4/2004  Fukuzawa et al.
2010/0028766 A1 *  2/2010  Peckerar ............... H01M 10/36
                                                                429/121

(Continued)

FOREIGN PATENT DOCUMENTS

JP    2003168416 A  *  6/2003  ........ H01M 10/0562
JP    2004-134210       4/2004
(Continued)

OTHER PUBLICATIONS

Machine Translation JP 2003-168416A (Year: 2003).*

*Primary Examiner* — Victoria H Lynch
(74) *Attorney, Agent, or Firm* — McDermott Will and Emery LLP

(57) ABSTRACT

A battery includes a first power generation element, a first outer cover body which encloses the first power generation element, and a first planar electrode having, as principal surfaces, a first connecting surface and a first protruding surface opposite the first connecting surface. The first connecting surface is electrically connected to the first power generation element. The first outer cover body includes a first covering portion provided with a first opening. The first protruding surface protrudes from the first opening toward an outside of the first covering portion. The first covering portion is joined to at least one of the first planar electrode and the first power generation element.

19 Claims, 26 Drawing Sheets

(51) Int. Cl.
| | |
|---|---|
| H01M 2/02 | (2006.01) |
| H01M 2/24 | (2006.01) |
| H01M 2/30 | (2006.01) |
| H01M 4/131 | (2010.01) |
| H01M 4/133 | (2010.01) |
| H01M 4/525 | (2010.01) |
| H01M 4/587 | (2010.01) |
| H01M 4/62 | (2006.01) |
| H01M 4/66 | (2006.01) |
| H01M 10/0525 | (2010.01) |
| H01M 10/0562 | (2010.01) |
| H01M 4/04 | (2006.01) |
| H01M 4/1391 | (2010.01) |
| H01M 4/1393 | (2010.01) |
| H01M 4/02 | (2006.01) |

(52) U.S. Cl.
CPC ......... *H01M 2/0215* (2013.01); *H01M 2/206* (2013.01); *H01M 2/24* (2013.01); *H01M 2/30* (2013.01); *H01M 4/131* (2013.01); *H01M 4/133* (2013.01); *H01M 4/525* (2013.01); *H01M 4/587* (2013.01); *H01M 4/623* (2013.01); *H01M 4/625* (2013.01); *H01M 4/661* (2013.01); *H01M 10/0413* (2013.01); *H01M 10/0436* (2013.01); *H01M 10/0525* (2013.01); *H01M 10/0562* (2013.01); *H01M 4/043* (2013.01); *H01M 4/0404* (2013.01); *H01M 4/0471* (2013.01); *H01M 4/1391* (2013.01); *H01M 4/1393* (2013.01); *H01M 10/044* (2013.01); *H01M 10/0418* (2013.01); *H01M 2004/027* (2013.01); *H01M 2004/028* (2013.01); *H01M 2300/0068* (2013.01)

(58) Field of Classification Search
CPC .. H01M 4/0404; H01M 4/043; H01M 4/0471; H01M 4/131; H01M 4/133; H01M 4/1391; H01M 4/1393; H01M 4/525; H01M 4/587; H01M 4/623; H01M 4/625; H01M 4/661

See application file for complete search history.

(56) References Cited

U.S. PATENT DOCUMENTS

| | | | |
|---|---|---|---|
| 2010/0178554 A1* | 7/2010 | Hama | H01M 2/02 429/185 |
| 2013/0089769 A1* | 4/2013 | Proctor | H01G 11/28 429/127 |

FOREIGN PATENT DOCUMENTS

| | | |
|---|---|---|
| JP | 2004-206942 | 7/2004 |
| JP | 2007-273349 | 10/2007 |
| JP | 2009-218010 | 9/2009 |
| JP | 2013-093135 | 5/2013 |
| JP | 2016-066457 | 4/2016 |

* cited by examiner

2600

2700

3200

4200

BATTERY

BACKGROUND

1. Technical Field

The present disclosure relates to a battery.

2. Description of the Related Art

Japanese Unexamined Patent Application Publication No. 2004-134210 discloses a current collector which is exposed outside of a battery in the stacking direction of electrodes.

Japanese Patent No. 5055580 discloses a battery case in which lead-out electrodes are incorporated.

SUMMARY

In the related art, it is not possible to secure a stable electrical connection.

In one general aspect, the techniques disclosed here feature a battery including a first power generation element, a first outer cover body which encloses the first power generation element, and a first planar electrode having, as principal surfaces, a first connecting surface and a first protruding surface opposite the first connecting surface. The first connecting surface is electrically connected to the first power generation element. The first outer cover body includes a first covering portion provided with a first opening. The first protruding surface protrudes from the first opening toward an outside of the first covering portion. The first covering portion is joined to at least one of the first planar electrode and the first power generation element.

According to the present disclosure, it is possible to secure a stable electrical connection.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The embodiments of the present disclosure will be described below with reference to the drawings.

Embodiment 1

Figure 1:
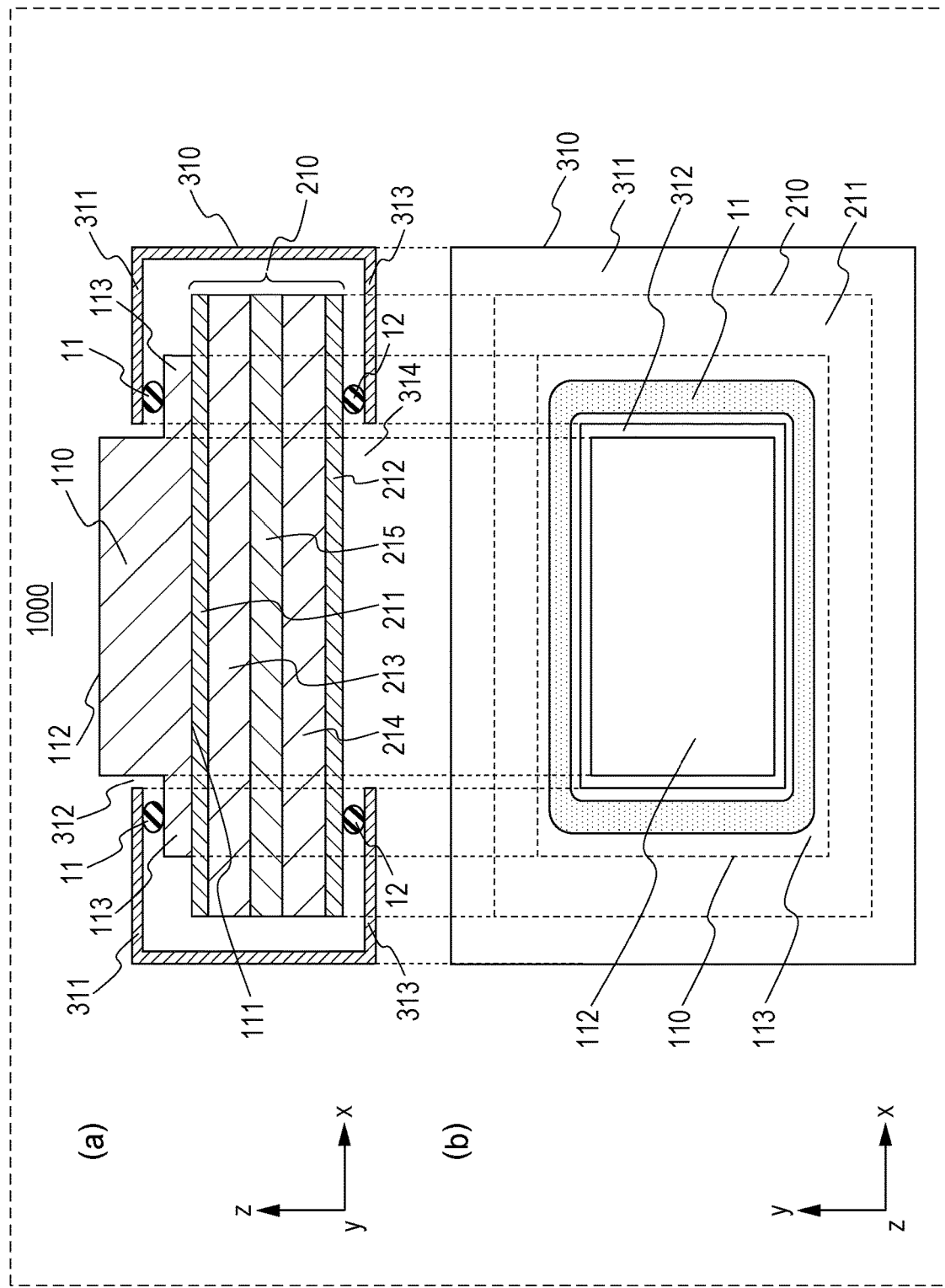
FIG. 1 illustrates a cross-sectional view and a top perspective view, each showing a schematic configuration of a battery in Embodiment 1.

FIG. 1 illustrates a cross-sectional view and a top perspective view, each showing a schematic configuration of a battery 1000 in Embodiment 1.

FIG. 1(*a*) is an x-z view (cross-sectional view) showing the schematic configuration of the battery 1000 in Embodiment 1.

FIG. 1(*b*) is an x-y view (top perspective view) showing the schematic configuration of the battery 1000 in Embodiment 1.

The battery 1000 in Embodiment 1 includes a first planar electrode 110, a first power generation element 210, and a first outer cover body 310.

The first outer cover body 310 encloses the first power generation element 210.

The first planar electrode 110 has, as principal surfaces, a first connecting surface 111 and a first protruding surface 112.

The first protruding surface 112 is opposite the first connecting surface 111.

The first connecting surface 111 is electrically connected to the first power generation element 210.

The first outer cover body 310 includes a first covering portion 311.

The first covering portion 311 is provided with a first opening 312.

The first protruding surface 112 protrudes from the first opening 312 toward the outside of the first covering portion 311.

In such a configuration, it is possible to secure a stable electrical connection. More specifically, the first protruding surface 112 can be uniformly brought into surface contact with a connecting object. Accordingly, the current density can be made uniform between the first planar electrode 110 and the connecting object. Because of this, the connection resistance value between the first planar electrode 110 and the connecting object can be decreased. Consequently, for example, even in the case where the first power generation element 210 is charged and discharged with high current, it is possible to reduce the occurrence of voltage loss, heat generation, or the like.

These advantages will be described in detail with reference to Comparative Examples 1 and 2.

Figure 27:
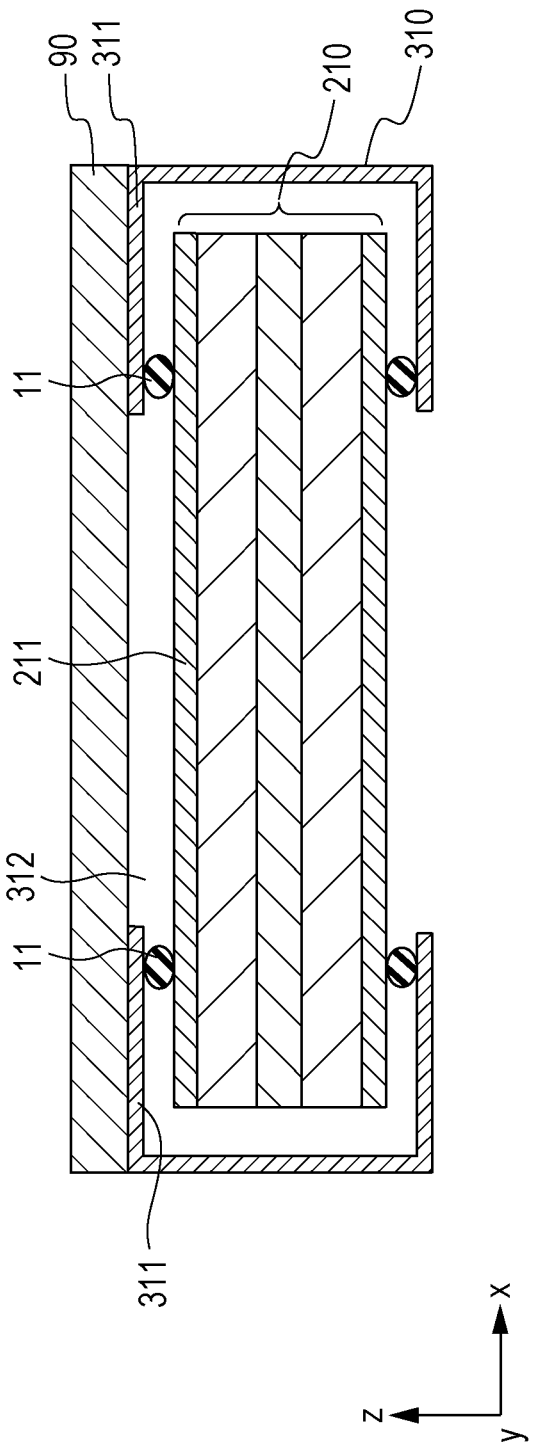
FIG. 27 is a cross-sectional view showing a schematic configuration of a battery in Comparative Example 1.

FIG. 27 is a cross-sectional view showing a schematic configuration of a battery 910 in Comparative Example 1.

The battery 910 in Comparative Example 1 includes a first power generation element 210 and a first outer cover body 310.

The first outer cover body 310 encloses the first power generation element 210.

The first outer cover body 310 includes a first covering portion 311.

The first covering portion 311 is provided with a first opening 312.

The battery 910 in Comparative Example 1 does not include a first planar electrode 110.

Accordingly, as shown in FIG. 27, in the first opening 312, a space occurs between a connecting portion (e.g., a first current collector 211) of the first power generation element 210 and a connecting object 90 (e.g., another battery, a connecting terminal, or the like). The space corresponds to the thickness of the first covering portion 311 (in the case where a first sealing portion 11 is present, the thickness of the first covering portion 311 and the first sealing portion 11).

Figure 28:
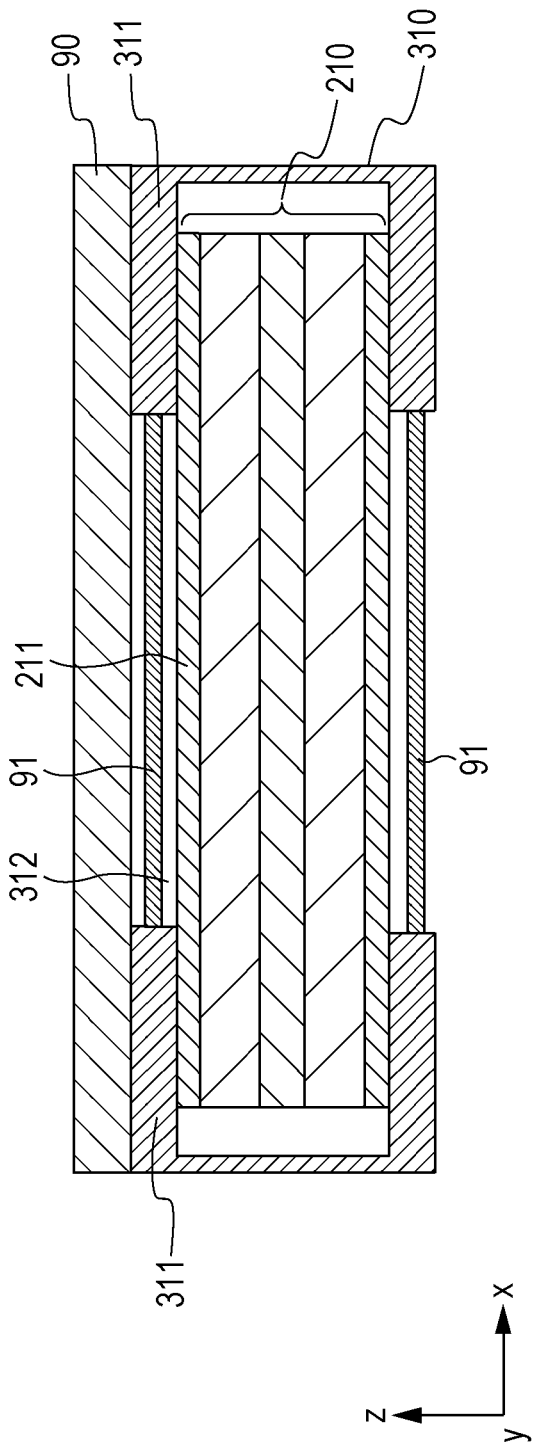
FIG. 28 is a cross-sectional view showing a schematic configuration of a battery in Comparative Example 2.

FIG. 28 is a cross-sectional view showing a schematic configuration of a battery 920 in Comparative Example 2.

The battery 920 in Comparative Example 2 includes a first power generation element 210, a first outer cover body 310, and a built-in electrode 91.

The first outer cover body 310 encloses the first power generation element 210.

The first outer cover body 310 includes a first covering portion 311.

The first covering portion 311 is provided with a first opening 312.

The built-in electrode 91 is disposed in a built-in manner in the first covering portion 311 in the first opening 312.

The battery 920 in Comparative Example 2 does not include a first planar electrode 110.

As shown in FIG. 28, in the first opening 312, a space occurs between the built-in electrode 91 and a connecting object 90 (e.g., another battery, a connecting terminal, or the like). Furthermore, in the first opening 312, a space occurs between the built-in electrode 91 and a connecting portion (e.g., a first current collector 211) of the first power generation element 210. These spaces are caused by the difference in the thickness between the built-in electrode 91 and the first covering portion 311 or the installation position of the built-in electrode 91.

As described above, in Comparative Examples 1 and 2, a current-carrying portion does not protrude with respect to the first covering portion 311. This causes the spaces, and an unstable electrical connection is likely to occur when connected to the connecting object 90 (e.g., when a plurality of batteries are connected). Consequently, in the comparative examples, in particular, when charging and discharging are performed with high current, problems due to the resistance of the connecting portion (occurrence of voltage loss and heat generation, and the like) are likely to occur.

In contrast, in Embodiment 1, as described above, by using the first planar electrode 110, for example, even in the case where a plurality of batteries are connected, an electrical connection can be stably secured. Therefore, it is possible to provide a structure that is suitable even for a charging and discharging operation with high current.

Note that the first planar electrode 110 is composed of an electrically conductive material. For example, the first planar electrode 110 may be composed of a metallic material. For example, the first planar electrode 110 may be a metal, such as copper, aluminum, nickel, iron, stainless steel, or titanium, an alloy thereof, or any of these having a plated surface. As a material for the first planar electrode 110, a commonly known electrode material which is a good conductor of electricity can be used.

Furthermore, as shown in FIG. 1, in the first planar electrode 110, the area of the first connecting surface 111 may be larger than the area of the first protruding surface 112.

In the configuration described above, it is possible to further increase the contact area between the first connecting surface 111 and a connecting portion (e.g., a first current collector 211) of the first power generation element 210.

Figure 2:
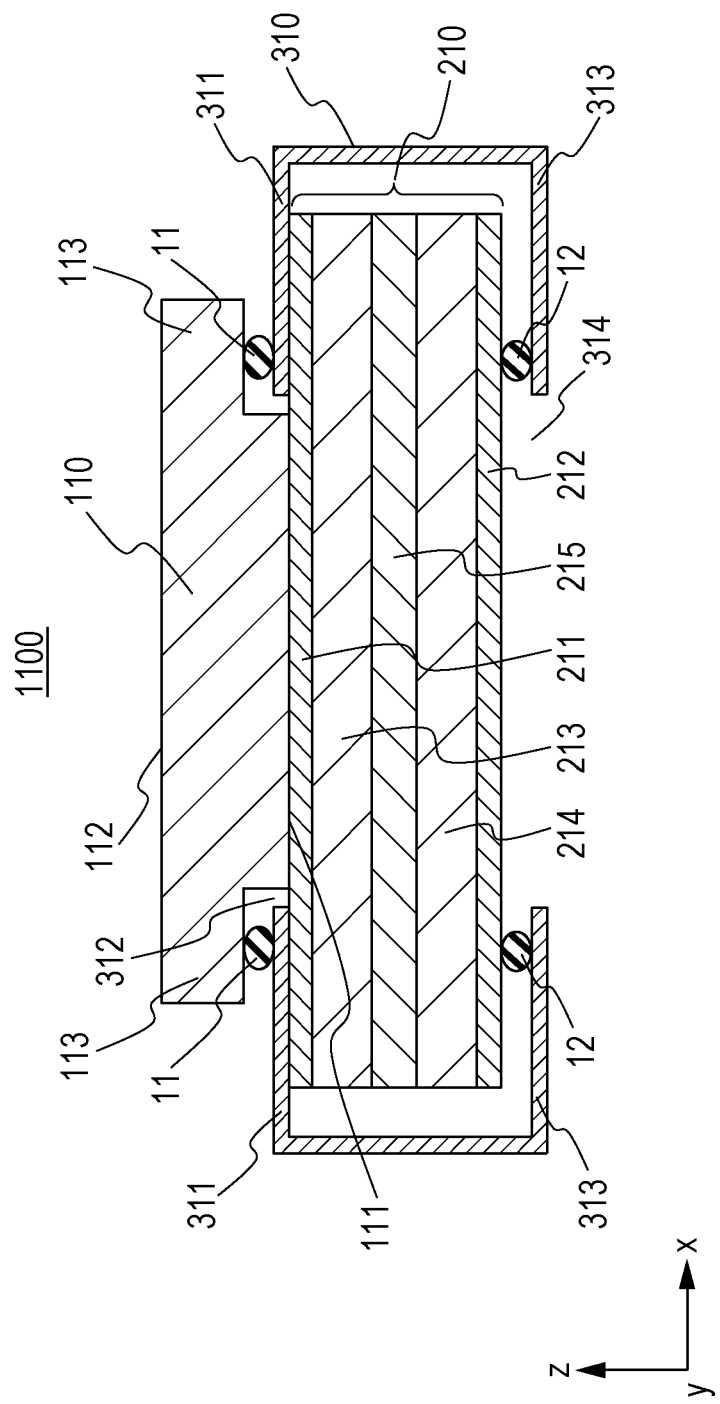
FIG. 2 is a cross-sectional view showing a schematic configuration of a battery in Embodiment 1.

FIG. 2 is a cross-sectional view showing a schematic configuration of a battery 1100 in Embodiment 1.

In the battery 1100 according to Embodiment 1, in the first planar electrode 110, the area of the first protruding surface 112 is larger than the area of the first connecting surface 111.

In the configuration described above, it is possible to further increase the contact area between the first protruding surface 112 and a connecting object.

In the configuration examples shown in FIGS. 1 and 2, the first connecting surface 111 is in surface contact with the first current collector 211 of the first power generation element 210.

Furthermore, in the configuration examples shown in FIGS. 1 and 2, the first planar electrode 110 is arranged parallel to the first current collector 211.

Note that the outside of the first covering portion 311 (i.e., the outside of the first outer cover body 310) means the side on which the first power generation element 210 is not placed. The inside of the first covering portion 311 (i.e., the inside of the first outer cover body 310) means the side on which the first power generation element 210 is placed.

FIGS. 29A to 29D are each a cross-sectional view showing a schematic configuration of a modification example of a battery in Embodiment 1.

As shown in FIGS. 29A to 29D, in Embodiment 1, the first covering portion 311 may be joined to at least one of the first planar electrode 110 and the first power generation element 210.

In the configuration described above, it is possible to prevent the outside air from entering the first outer cover body 310 through the first opening 312.

Figure 29A:
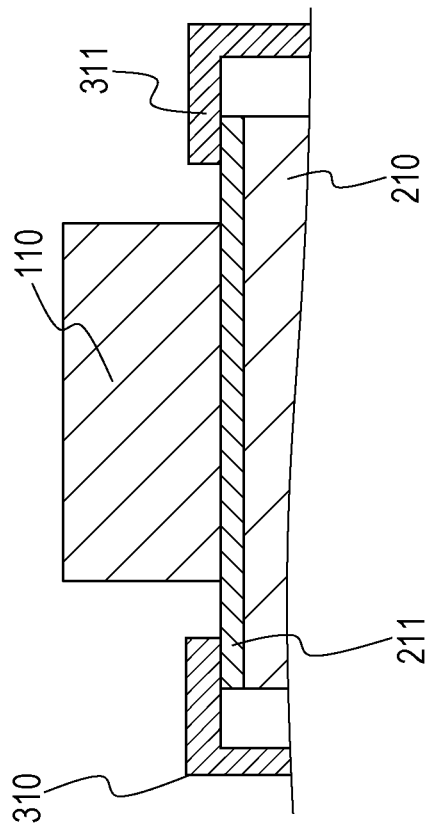
FIGS. 29A to 29D are each a cross-sectional view showing a schematic configuration of a modification example of a battery in Embodiment 1.
Figure 29B:
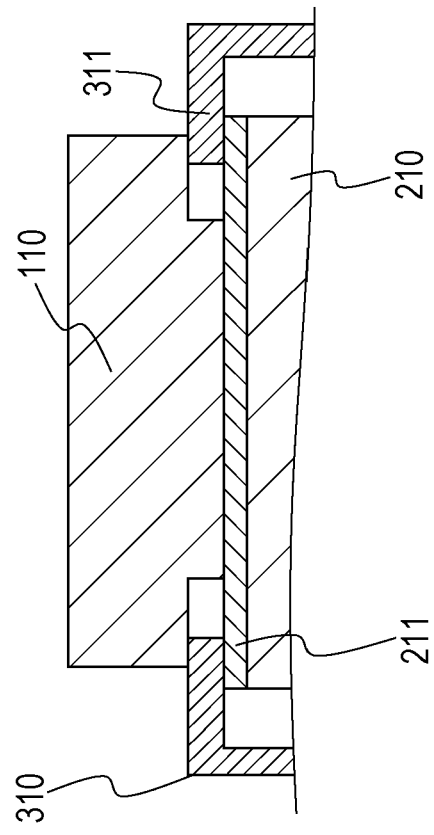
Figure 29C:
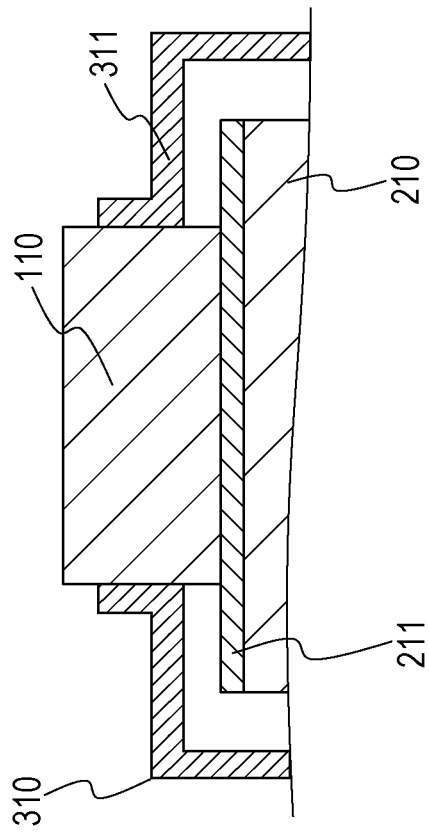
Figure 29D:
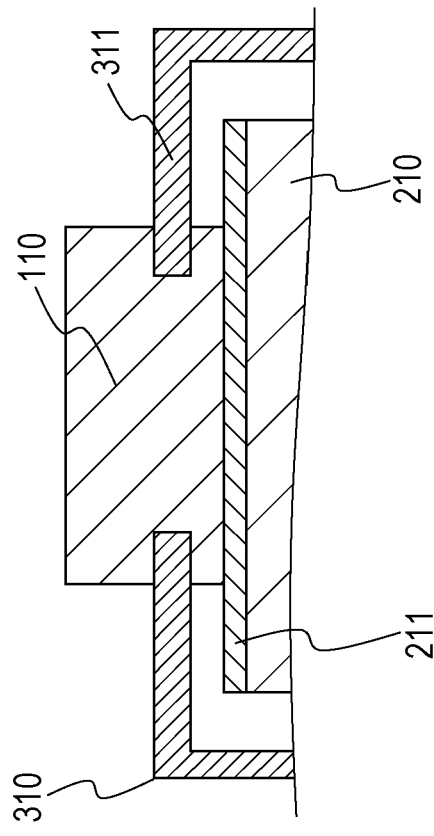

As shown in FIG. 29A, the first covering portion 311 may be joined to the side face of the first planar electrode 110. Alternatively, as shown in FIG. 29B, the first covering portion 311 may be engaged with part of the side face of the first planar electrode 110. Alternatively, as shown in FIG. 29C, the first covering portion 311 may be joined to the first current collector 211 of the power first generation element 210. Alternatively, as shown in FIG. 29D, the first covering portion 311 may be joined between and to the first current collector 211 of the first power generation element 210 and the first planar electrode 110.

In Embodiment 1, the first planar electrode 110 may include a first sealing end portion 113.

The first sealing end portion 113 is located so as to face the first covering portion 311.

A space between the first sealing end portion 113 and the first covering portion 311 is sealed.

In the configuration described above, it is possible to further increase the area of the sealing portion between the first planar electrode 110 and the first outer cover body 310. Consequently, it is possible to more firmly seal the space between the first planar electrode 110 and the first outer cover body 310. Furthermore, the first planar electrode 110 and the first outer cover body 310 can be held by each other more firmly. This can prevent occurrence of misalignment of the first planar electrode 110 and the like.

Figure 3:
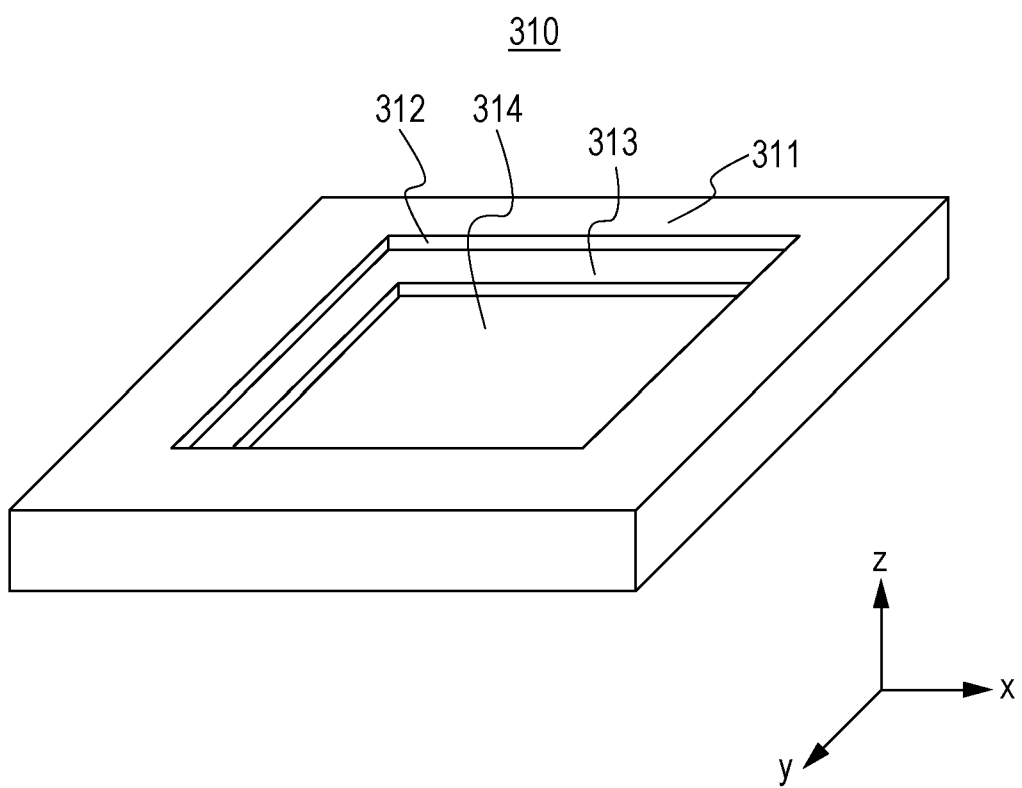
FIG. 3 is a perspective view showing a schematic configuration of a first outer cover body in Embodiment 1.

FIG. 3 is a perspective view showing a schematic configuration of the first outer cover body 310 in Embodiment 1.

As shown in FIG. 3, opposite two faces (i.e., a first covering portion 311 and a second covering portion 313) of the first outer cover body 310 are provided with a first opening 312 and a second opening 314, which are windows for leading out an electrode, respectively.

The opening may have a rectangular, circular, or other shape.

The first outer cover body 310 may be, for example, a sealing case, laminated seal, or the like. The sealing case may be, for example, a laminated case, laminated bag, metal can, resin case, or the like.

The first outer cover body 310 and the first power generation element 210 are sealed.

For example, as shown in FIGS. 1 and 2, the space between the first sealing end portion 113 and the first covering portion 311 may be sealed with a first sealing portion 11.

Furthermore, as shown in FIGS. 1 and 2, the space between the first power generation element 210 (e.g., the second current collector 212) and the second covering portion 313 may be sealed with a second sealing portion 12.

In the configuration described above, it is possible to prevent portions of the first power generation element 210, other than the portions exposed from the opening, from being exposed to the outside atmosphere.

In the battery 1000 shown in FIG. 1, the first sealing portion 11 is located inside the first outer cover body 310.

Furthermore, in the battery 1100 shown in FIG. 2, the first sealing portion 11 is located outside the first outer cover body 310.

Furthermore, as shown in FIG. 1, the first sealing portion 11 may join the first planar electrode 110 and the first covering portion 311 to each other around the entire periphery of the first opening 312 of the first outer cover body 310.

In the configuration described above, it is possible to further prevent the outside air from entering the first outer cover body 310 through the first opening 312.

Note that the first outer cover body 310 may partly serve as the first sealing portion 11 and the second sealing portion 12. Alternatively, the first sealing portion 11 and the second sealing portion 12 may be made of a sealant that is different from the material of the first outer cover body 310. A commonly known sealing material can be used as the sealant.

The sealing between the first outer cover body 310 and the first planar electrode 110 may be performed by joining. The sealing by joining may be performed through an insulating sealing member. Furthermore, the first outer cover body 310 and the first planar electrode 110 may be connected to each other by a permanent connection means. The permanent connection means may be welding or adhesion. Furthermore, the first outer cover body 310 and the first planar electrode 110 may be connected to each other by other connecting methods, such as a gasket, heat-sealing, and compression.

Furthermore, as shown in FIGS. 1 and 2, the first power generation element 210 in Embodiment 1 may include the first current collector 211, the second current collector 212, a first active material layer 213, a second active material layer 214, and a first solid electrolyte layer 215.

The first active material layer 213 contains a first active material.

The second active material layer 214 contains a second active material.

The first solid electrolyte layer 215 contains a solid electrolyte.

The first solid electrolyte layer 215 is disposed between the first active material layer 213 and the second active material layer 214.

As described above, the battery in Embodiment 1 may be an all-solid-state battery.

All-solid-state batteries do not use liquid electrolytes unlike liquid-based batteries and, therefore, have a low combustion risk and high safety. In all-solid-state batteries, solid electrolytes are used instead of liquid electrolytes. Accordingly, the state of joining between each of a positive electrode and a negative electrode and a solid electrolyte becomes important. An all-solid-state battery can be fabricated by a thin-film deposition process. Alternatively, a positive electrode layer, a negative electrode layer, and a solid electrolyte layer can be formed by a coating process that has high productivity. The resulting layers are stacked in close contact with one another to allow an all-solid-state battery to function. Characteristics, other than safety, of all-solid-state batteries include a high charge-discharge rate (i.e., excellent high-current characteristics). It is possible to achieve further increases in the size and capacity of all-solid-state batteries. As described above, all-solid-state batteries are used with high current. Accordingly, in the case where the battery of Embodiment 1 is constructed in particular as an all-solid-state battery, the effect of securing a stable electrical connection can be more markedly obtained.

The first active material layer 213 may be a positive electrode active material layer. In this case, the first active material is a positive electrode active material. The first current collector 211 is a positive electrode current collector. The second active material layer 214 is a negative electrode active material layer. The second active material is a negative electrode active material. The second current collector 212 is a negative electrode current collector.

Alternatively, the first active material layer 213 may be a negative electrode active material layer. In this case, the first active material is a negative electrode active material. The first current collector 211 is a negative electrode current collector. The second active material layer 214 is a positive electrode active material layer. The second active material is a positive electrode active material. The second current collector 212 is a positive electrode current collector.

The first power generation element 210 shown in each of FIGS. 1 and 2 is configured to be a single battery cell.

As shown in FIGS. 1 and 2, the first active material layer 213, the second active material layer 214, and the first solid electrolyte layer 215 are disposed between the first current collector 211 and the second current collector 212. The first active material layer 213 is disposed on the first current collector 211. The second active material layer 214 is disposed on the second current collector 212. The first solid electrolyte layer 215 is disposed on the first active material layer 213 or the second active material layer 214.

In the manufacturing process, the formation order of the layers is not particularly limited. For example, sequential deposition, lamination, transfer, or a combination of these methods can be used.

The first active material layer 213 and the second active material layer 214 each may be formed in a narrower region than that of the first current collector 211 or the second current collector 212. Furthermore, the first solid electrolyte layer 215 may be formed so as to have a larger area than the first active material layer 213 and the second active material layer 214. Thereby, it is possible to prevent a short circuit due to direct contact between the positive electrode layer and the negative electrode layer.

The formation region of the first active material layer 213 may be the same as the formation region of the second active material layer 214. Alternatively, the formation region of the negative electrode active material layer may be made larger than the formation region of the positive electrode active material layer. Thereby, for example, it is possible to prevent a decrease in reliability of the battery due to lithium precipitation.

The formation region of the first solid electrolyte layer 215 may be the same as the formation region of each of the first current collector 211 and the second current collector 212. Alternatively, the first solid electrolyte layer 215 may be formed in a narrower region than that of the first current collector 211 or the second current collector 212.

A metal, such as SUS or Al, can be used as a constituent material for the positive electrode current collector. The thickness of the positive electrode current collector may be, for example, 5 to 100 µm.

As the positive electrode active material to be contained in the positive electrode active material layer, a known positive electrode active material (e.g., lithium cobalt oxide, LiNO, or the like) can be used. Various materials that allow Li to be desorbed and inserted can be used as a material for the positive electrode active material.

Furthermore, a known solid electrolyte (e.g., an inorganic solid electrolyte or the like) can be used as a material to be contained in the positive electrode active material layer. As the inorganic solid electrolyte, a sulfide solid electrolyte, an oxide solid electrolyte, or the like can be used. As the sulfide solid electrolyte, for example, a mixture of $Li_2S:P_2S_5$ can be used. The surface of the positive electrode active material may be coated with a solid electrolyte. Furthermore, as materials to be contained in the positive electrode active material layer, an electrically conductive material (e.g., acetylene black or the like), a binder (e.g., polyvinylidene fluoride or the like), and others can be used.

A coating material in the form of a paste, which is prepared by kneading these materials to be contained in the positive electrode active material layer together with a solvent, is applied onto a surface of the positive electrode current collector, followed by drying, and thereby, it is possible to fabricate a positive electrode active material layer. In order to increase the density of the positive electrode active material layer, pressing may be performed after drying. The thickness of the positive electrode active material layer thus fabricated is, for example, 5 to 300 µm.

A metal, such as SUS or Cu, can be used as a constituent material for the negative electrode current collector. The thickness of the negative electrode current collector may be, for example, 5 to 100 µm.

As the negative electrode active material to be contained in the negative electrode active material layer, a known negative electrode active material (e.g., graphite or the like) can be used. Various materials that allow Li to be desorbed and inserted can be used as a material for the negative electrode active material.

Furthermore, a known solid electrolyte (e.g., an inorganic solid electrolyte or the like) can be used as a material to be contained in the negative electrode active material layer. As the inorganic solid electrolyte, a sulfide solid electrolyte, an oxide solid electrolyte, or the like can be used. As the sulfide solid electrolyte, for example, a mixture of $Li_2S:P_2S_5$ can be used. Furthermore, as materials to be contained in the negative electrode active material layer, an electrically conductive material (e.g., acetylene black or the like), a binder (e.g., polyvinylidene fluoride or the like), and others can be used.

A coating material in the form of a paste, which is prepared by kneading these materials to be contained in the negative electrode active material layer together with a solvent, is applied onto a surface of the negative electrode current collector, followed by drying, and thereby, it is possible to fabricate a negative electrode active material layer. In order to increase the density of the negative electrode active material layer, the negative electrode plate may be pressed. The thickness of the negative electrode active material layer thus fabricated is, for example, 5 to 300 µm.

A known solid electrolyte (e.g., an inorganic solid electrolyte or the like) can be used as a solid electrolyte to be contained in the first solid electrolyte layer 215. As the inorganic solid electrolyte, a sulfide solid electrolyte, an oxide solid electrolyte, or the like can be used. As the sulfide solid electrolyte, for example, a mixture of $Li_2S:P_2S_5$ can be used.

Furthermore, as materials to be contained in the first solid electrolyte layer 215, a binder (e.g., polyvinylidene fluoride or the like) and others can be used.

A coating material in the form of a paste, which is prepared by kneading these materials to be contained together with a solvent, is applied onto the positive electrode active material layer or the negative electrode active material layer, followed by drying, and thereby, it is possible to fabricate a solid electrolyte layer.

Figure 4:
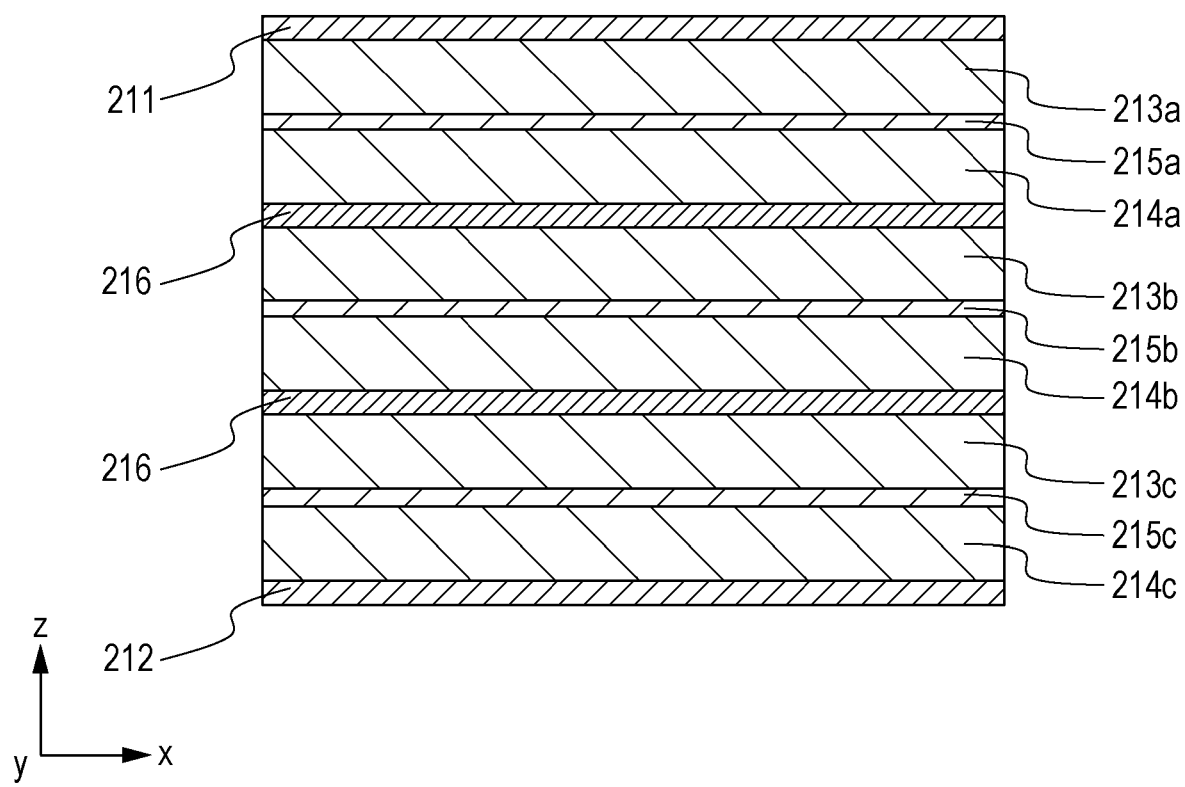
FIG. 4 is a cross-sectional view showing a schematic configuration of a first power generation element in Embodiment 1.

FIG. 4 is a cross-sectional view showing a schematic configuration of a first power generation element 210 in Embodiment 1.

The first power generation element 210 shown in each of FIGS. 1 and 2 may be configured to include a plurality of battery cells as shown in FIG. 4.

The first power generation element 210 shown in FIG. 4 includes a first current collector 211, a second current collector 212, first active material layers (213a, 213b, and 213c), second active material layers (214a, 214b, and 214c), first solid electrolyte layers (215a, 215b, and 215c), and bipolar current collectors 216.

In the first power generation element 210 shown in FIG. 4, except at the upper and lower ends of the power generation element, each bipolar current collector 216 functions as both a positive electrode current collector and a negative electrode current collector.

A first active material layer 213, a first solid electrolyte layer 215, and a second active material layer 214 are disposed on the upper surface of a bipolar current collector 216 in reverse order from that on the lower surface of the bipolar current collector 216.

By employing such a structure, it is possible to construct a high-voltage power generation element part in which power generation elements are connected in series.

In the manufacturing process, the formation order of the layers is not particularly limited. For example, sequential deposition, lamination, transfer, or a combination of these methods can be used.

Furthermore, each bipolar current collector 216, located at a position other than at the upper and lower ends of the first power generation element 210, has a positive electrode current collector surface to which a positive electrode active material layer is joined and a negative electrode current collector surface to which a negative electrode active material layer is joined, the surfaces being opposite each other.

The bipolar current collector 216 may be formed of a metal foil. Alternatively, the bipolar current collector 216 may be formed of a metal foil having two sides with different qualities. Alternatively, the bipolar current collector 216 may include two metal foils which overlie each other. Alternatively, the bipolar current collector 216 may have any other configuration as long as the upper and lower power generation elements can be electrically connected to each other.

One of a positive electrode active material layer and a negative electrode active material layer is joined to current collectors located at the upper and lower ends of the first power generation element 210.

Figure 5A:
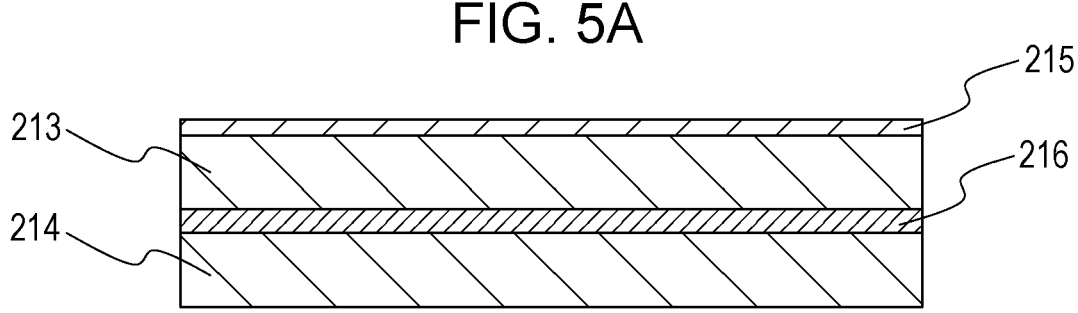
FIGS. 5A and 5B are each a cross-sectional view showing an example of a stacking unit of a first power generation element in Embodiment 1.
Figure 5B:
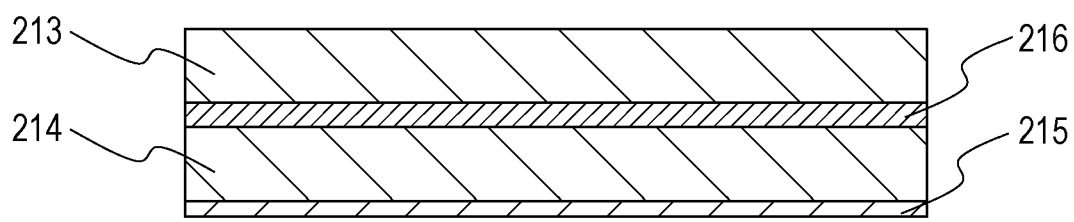

FIGS. 5A and 5B are each a cross-sectional view showing an example of a stacking unit of a first power generation element 210 in Embodiment 1.

A structure in which a positive electrode active material layer, a negative electrode active material layer, and a solid electrolyte layer are disposed on the two surfaces of a bipolar current collector 216 is defined as a bipolar stacking unit.

On one of the upper and lower ends of a bipolar stacking unit or a stacked body in which bipolar stacking units are stacked, a positive electrode current collector having a positive electrode active material layer formed thereon or a positive electrode current collector having a positive electrode active material layer and a solid electrolyte layer formed thereon is stacked. On the other of the upper and lower ends of the stacked body, a negative electrode current collector having a negative electrode active material layer and a solid electrolyte layer formed thereon or a negative electrode current collector having a negative electrode active material layer formed thereon is stacked. Thereby, it is possible to obtain a first power generation element 210 shown in FIG. 4.

The first power generation element 210 is compressed in the stacking direction, by using a pressing machine or the like, such that the positive electrode active material layer and the negative electrode active material layer face each other with the solid electrolyte layer therebetween. By performing compression, it is possible to obtain a state in which dense layers are satisfactorily joined to one another.

Note that in the first power generation element 210 in Embodiment 1, the number of bipolar stacking units is not particularly limited.

As described above, in Embodiment 1, the first power generation element 210 may include a first current collector 211.

In this case, the first connecting surface 111 may be in surface contact with a principal surface of the first current collector 211.

In the configuration described above, the first planar electrode 110 and the first power generation element 210 can be connected to each other with a larger contact area. Accordingly, the connection resistance value between the first planar electrode 110 and the first power generation element 210 can be further decreased. Consequently, for example, even in the case where the first power generation element 210 is charged and discharged with high current, it is possible to further reduce the occurrence of voltage loss, heat generation, or the like.

In Embodiment 1, the first planar electrode 110 may serve as the first current collector 211. That is, the first power generation element 210 may not be provided with the first current collector 211. In this case, the first planar electrode 110 may be in surface contact with the first active material layer 213.

Figure 6:
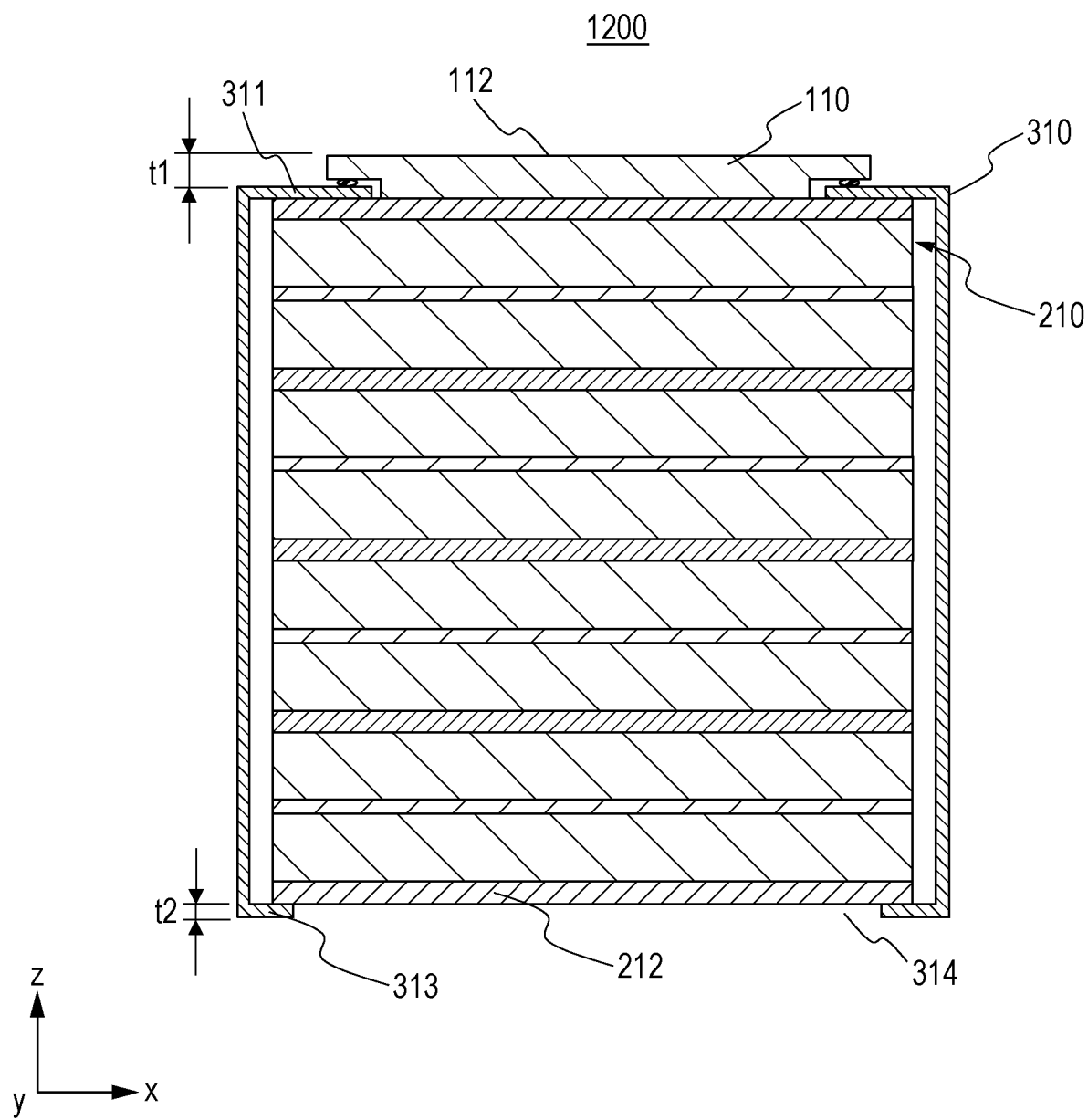
FIG. 6 is a cross-sectional view showing a schematic configuration of a battery in Embodiment 1.

FIG. 6 is a cross-sectional view showing a schematic configuration of a battery 1200 in Embodiment 1.

In the battery 1200 in Embodiment 1, the first outer cover body 310 includes a second covering portion 313 provided with a second opening 314.

In this case, the distance (t1) between the first protruding surface 112 and the first covering portion 311 is equal to or larger than the distance (t2) between the second covering portion 313 and the first power generation element 210 (e.g., the second current collector 212).

In the configuration described above, when a plurality of batteries 1200 are connected to one another, it is possible to secure a stabler electrical connection. More specifically, a first protruding surface 112 of one battery can be inserted inside a second covering portion 313 of another battery through a second opening 314. Therefore, the first protruding surface 112 of the one battery and a first power generation element 210 of the other battery can be connected more securely to each other. That is, for example, the first protruding surface 112 of the one battery can be uniformly brought into surface contact with the first power generation element 210 of the other battery. Accordingly, the current density can be made uniform between the first planar electrode 110 of the one battery and the first power generation element 210 of the other battery. Because of this, the connection resistance value between the first planar electrode 110 of the one battery and the first power generation element 210 of the other battery can be decreased. Consequently, for example, even in the case where the first power generation element 210 of the one battery and the first power generation element 210 of the other battery are charged and discharged with high current, it is possible to further reduce the occurrence of voltage loss, heat generation, or the like.

As shown in FIG. 6, at one of the upper and lower surfaces of the first outer cover body 310, a first planar electrode 110 may have a protruding portion with respect to the outer surface of the first outer cover body 310. Furthermore, at the other of the upper and lower surfaces of the first outer cover body 310, a first planar electrode 110 may have a receding portion with respect to the outer surface of the first outer cover body 310. In this case, the receding amount of the receding portion with respect to the outer surface of the first outer cover body 310 may be smaller than the height of the protruding portion with respect to the outer surface of the first outer cover body 310. That is, the protruding amount of the protruding portion may be larger than the receding amount of the receding portion. In this case, the form of the protruding portion is included in the form of the receding portion. By stacking the protruding portion on the receding portion, a plurality of batteries can be electrically connected to one another.

Figure 7:
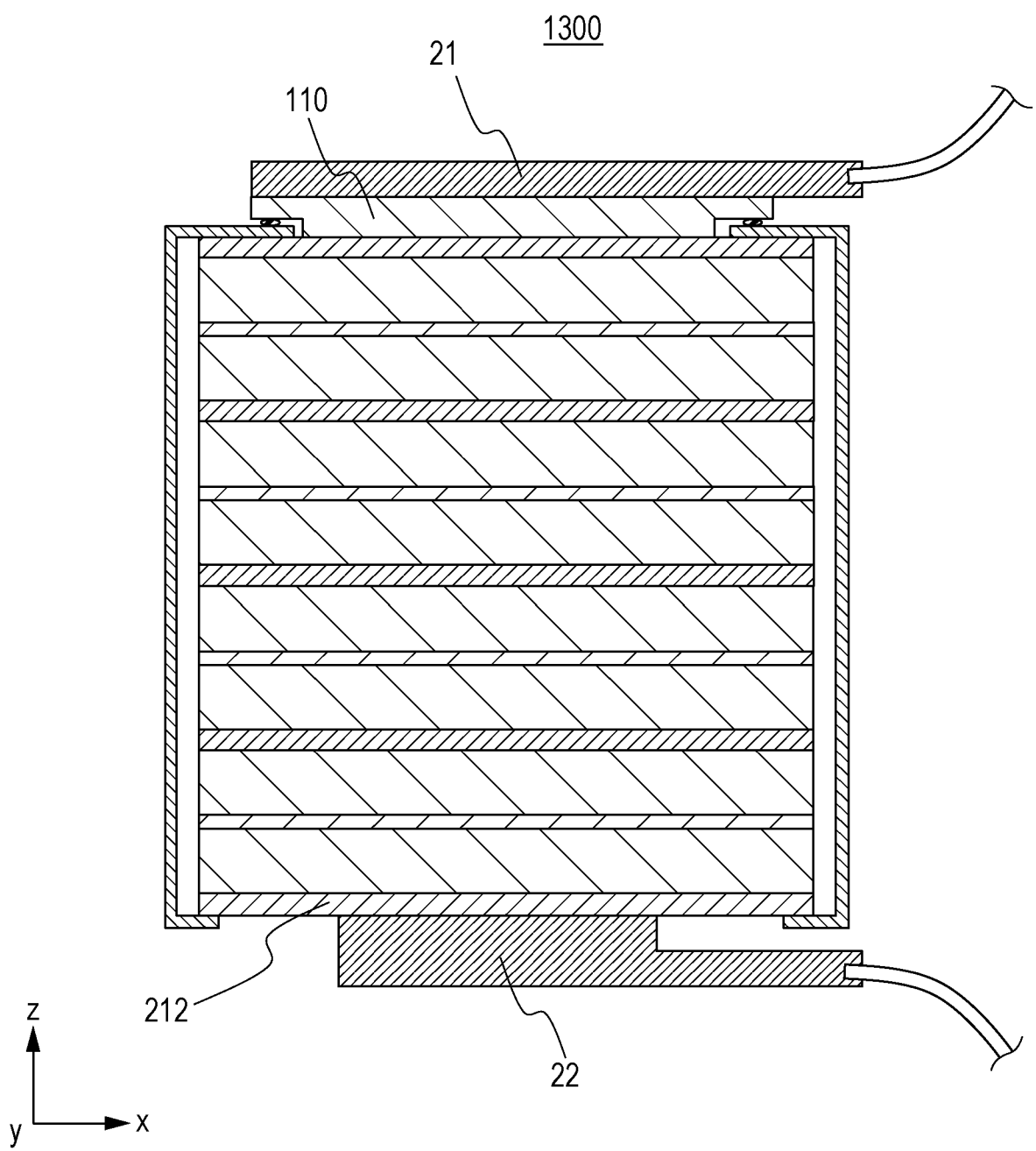
FIG. 7 is a cross-sectional view showing a schematic configuration of a battery in Embodiment 1.

FIG. 7 is a cross-sectional view showing a schematic configuration of a battery 1300 in Embodiment 1.

As shown in FIG. 7, a first planar electrode 110 may be connected to a terminal 21 (e.g., an external terminal for wiring).

Furthermore, as shown in FIG. 7, a second current collector 212 may be connected to a terminal 22 (e.g., an external terminal for wiring).

As described above, in the battery 1300 in Embodiment 1, the connecting object of the first planar electrode 110 is a terminal.

The connecting object of the first planar electrode 110 may be a planar electrode or current collector of a battery to be stacked (as will be described later).

Embodiment 2

Embodiment 2 will be described below. Descriptions that are duplicate of those in Embodiment 1 will be omitted appropriately.

Figure 8:
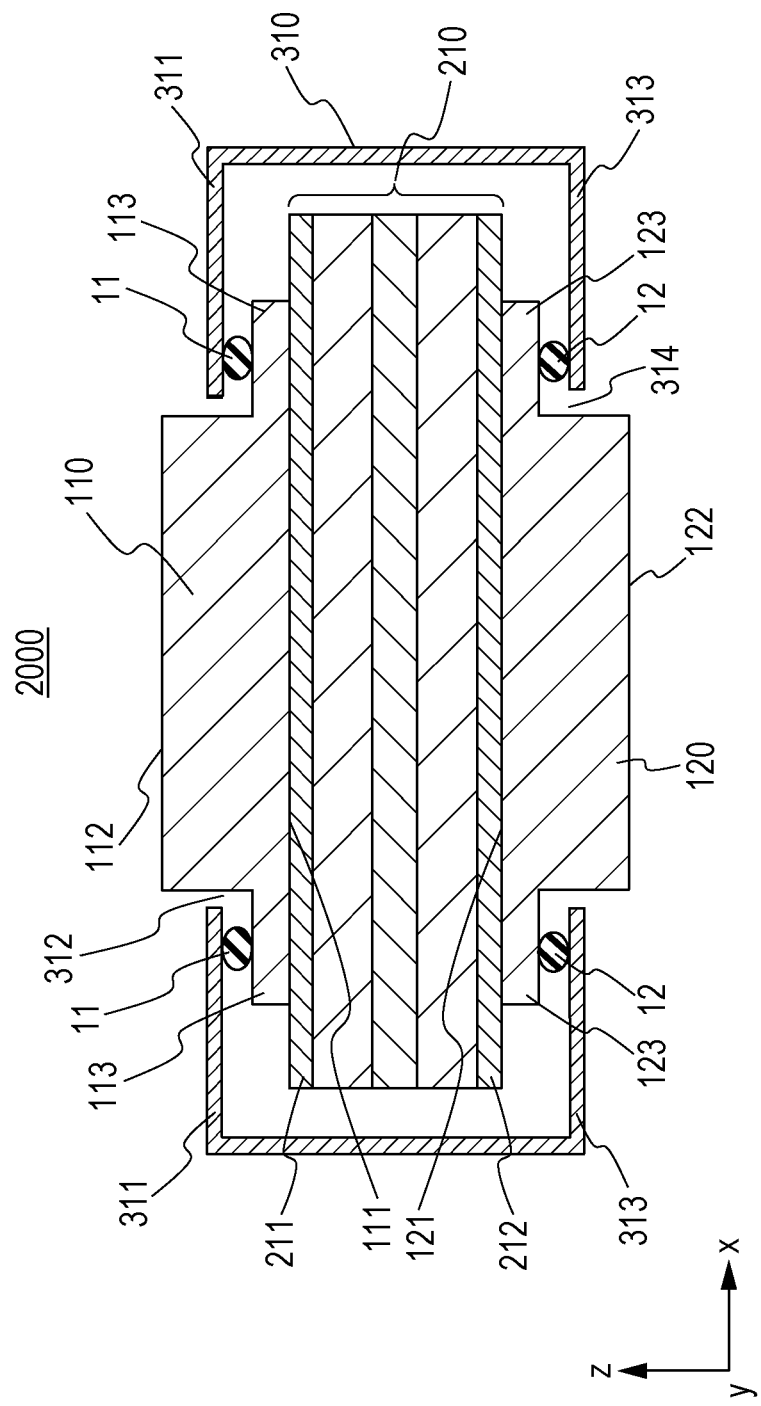
FIG. 8 is a cross-sectional view showing a schematic configuration of a battery in Embodiment 2.

FIG. 8 is a cross-sectional view showing a schematic configuration of a battery 2000 in Embodiment 2.

The battery 2000 in Embodiment 2 further includes the structure described below, in addition to the structure of the battery 1000 in Embodiment 1.

That is, the battery 2000 further includes a second planar electrode 120.

The second planar electrode 120 has, as principal surfaces, a second connecting surface 121 and a second protruding surface 122.

The second protruding surface 122 is opposite the second connecting surface 121.

The first connecting surface 111 is electrically connected to one electrode of the first power generation element 210.

The second connecting surface 121 is electrically connected to another electrode of the first power generation element 210.

The first outer cover body 310 includes a second covering portion 313.

The second covering portion 313 is provided with a second opening 314.

The second protruding surface 122 protrudes from the second opening 314 toward the outside of the second covering portion 313.

In the configuration described above, it is possible to secure a stable electrical connection at the two electrodes (i.e., the positive electrode and the negative electrode) of the first power generation element 210. More specifically, the second protruding surface 122 can be uniformly brought into surface contact with a second connecting object. Accordingly, the current density can be made uniform between the second planar electrode 120 and the second connecting object. Because of this, the connection resistance value between the second planar electrode 120 and the second connecting object can be decreased. Consequently, for example, even in the case where the first power generation element 210 is charged and discharged with high current, it is possible to further reduce the occurrence of voltage loss, heat generation, or the like.

The material that can be used for the first planar electrode 110 can be used as a material for the second planar electrode 120.

Furthermore, the second planar electrode 120 and the first planar electrode 110 may be composed of the same material and may have the same shape.

Alternatively, the second planar electrode 120 and the first planar electrode 110 may be composed of different materials and may have different shapes.

Furthermore, as shown in FIG. 8, in the second planar electrode 120, the area of the second connecting surface 121 may be larger than the area of the second protruding surface 122.

In the configuration described above, it is possible to further increase the contact area between the second connecting surface 121 and a connecting portion (e.g., a first current collector 211) of the first power generation element 210.

Figure 9:
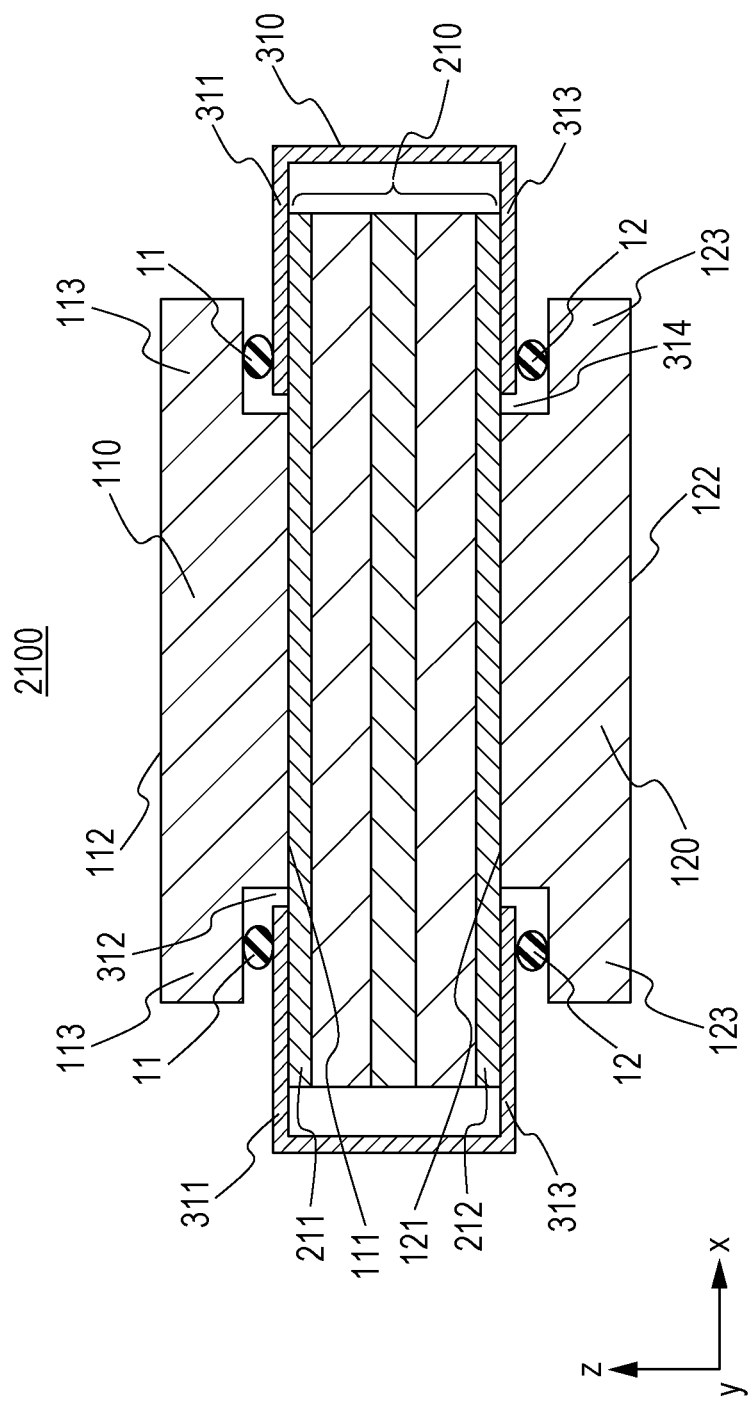
FIG. 9 is a cross-sectional view showing a schematic configuration of a battery in Embodiment 2.

FIG. 9 is a cross-sectional view showing a schematic configuration of a battery 2100 in Embodiment 2.

In the battery 2100 in Embodiment 2, in the second planar electrode 120, the area of the second protruding surface 122 is larger than the area of the second connecting surface 121.

In the configuration described above, it is possible to further increase the contact area between the second protruding surface 122 and a connecting object.

In the configuration examples shown in FIGS. 8 and 9, the second connecting surface 121 is in surface contact with the second current collector 212 of the first power generation element 210.

Furthermore, in the configuration examples shown in FIGS. 8 and 9, the second planar electrode 120 is arranged parallel to the second current collector 212.

Note that the outside of the second covering portion 313 (i.e., the outside of the first outer cover body 310) means the side on which the first power generation element 210 is not placed. The inside of the second covering portion 313 (i.e., the inside of the first outer cover body 310) means the side on which the first power generation element 210 is placed.

In Embodiment 2, the second planar electrode 120 may include a second sealing end portion 123.

The second sealing end portion 123 is located so as to face the second covering portion 313.

A space between the second sealing end portion 123 and the second covering portion 313 is sealed.

In the configuration described above, it is possible to further increase the area of the sealing portion between the second planar electrode 120 and the first outer cover body 310. Consequently, it is possible to more firmly seal the space between the second planar electrode 120 and the first outer cover body 310. Furthermore, the second planar electrode 120 and the first outer cover body 310 can be held by each other more firmly. This can prevent occurrence of misalignment of the second planar electrode 120 and the like.

As shown in FIGS. 8 and 9, the space between the second sealing end portion 123 and the second covering portion 313 may be sealed with a second sealing portion 12.

In the battery 2000 shown in FIG. 8, the second sealing portion 12 is located inside the first outer cover body 310.

Furthermore, in the battery 2100 shown in FIG. 9, the second sealing portion 12 is located outside the first outer cover body 310.

Furthermore, the second sealing portion 12 may join second planar electrode 120 and the second covering portion 313 to each other around the entire periphery of the second opening 314 of the first outer cover body 310.

In the configuration described above, it is possible to further prevent the outside air from entering the first outer cover body 310 through the second opening 314.

Figure 10:
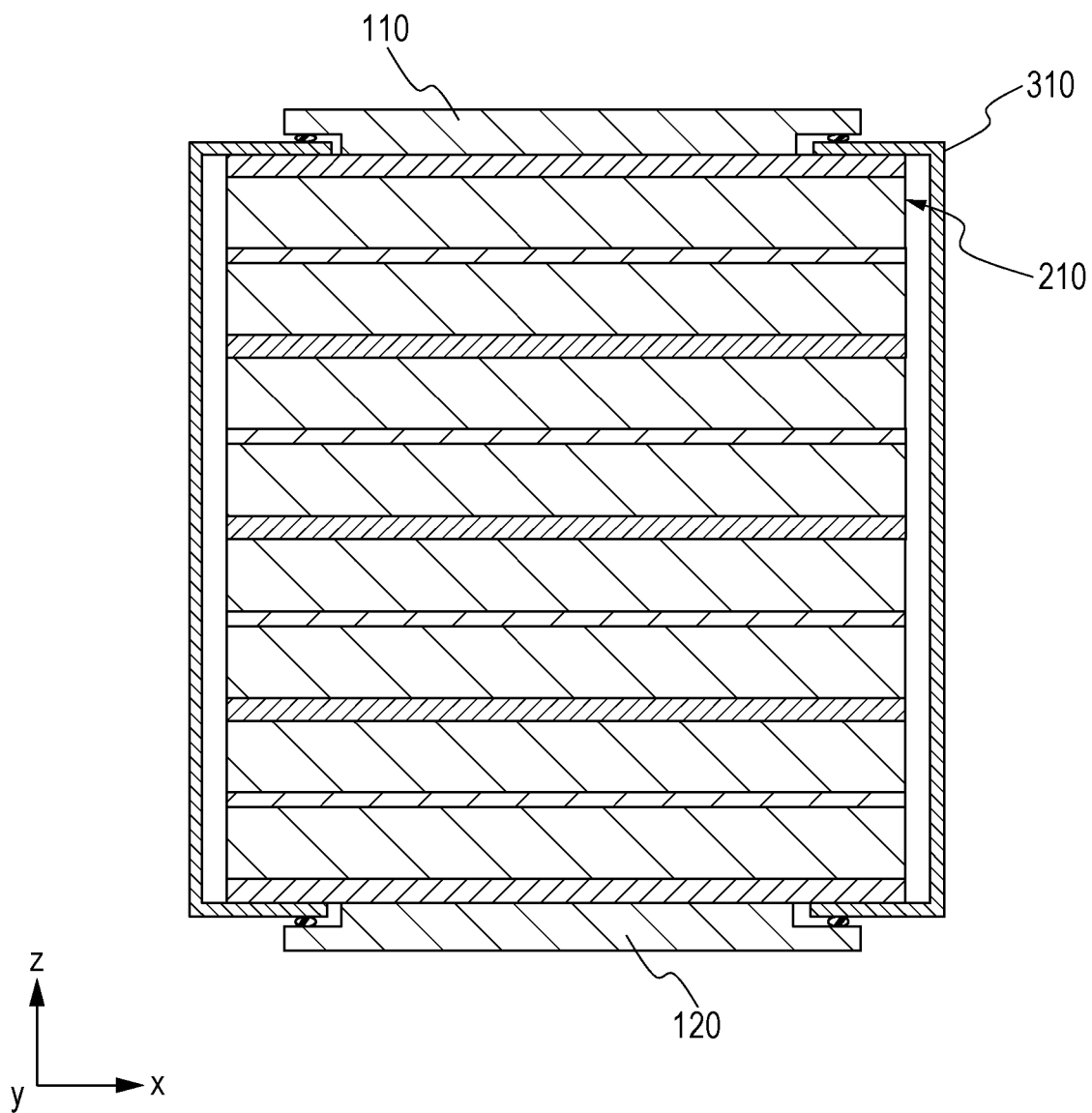
FIG. 10 is a cross-sectional view showing a schematic configuration of a battery in Embodiment 2.

FIG. 10 is a cross-sectional view showing a schematic configuration of a battery 2200 in Embodiment 2.

As shown in FIG. 10, the first power generation element 210 shown in each of FIGS. 8 and 9 may have the configuration including a plurality of battery cells shown in FIG. 4.

Furthermore, in Embodiment 2, the first power generation element 210 may include the second current collector 212.

In this case, the second connecting surface 121 may be in surface contact with a principal surface of the second current collector 212.

In the configuration described above, the second planar electrode 120 and the first power generation element 210 can be connected to each other with a larger contact area. Accordingly, the connection resistance value between the second planar electrode 120 and the first power generation element 210 can be further decreased. Consequently, for example, even in the case where the first power generation element 210 is charged and discharged with high current, it is possible to further reduce the occurrence of voltage loss, heat generation, or the like.

In Embodiment 2, the second planar electrode 120 may serve as the second current collector 212. That is, the first power generation element 210 may not be provided with the second current collector 212. In this case, the second planar electrode 120 may be in surface contact with the second active material layer 214.

Figure 11:
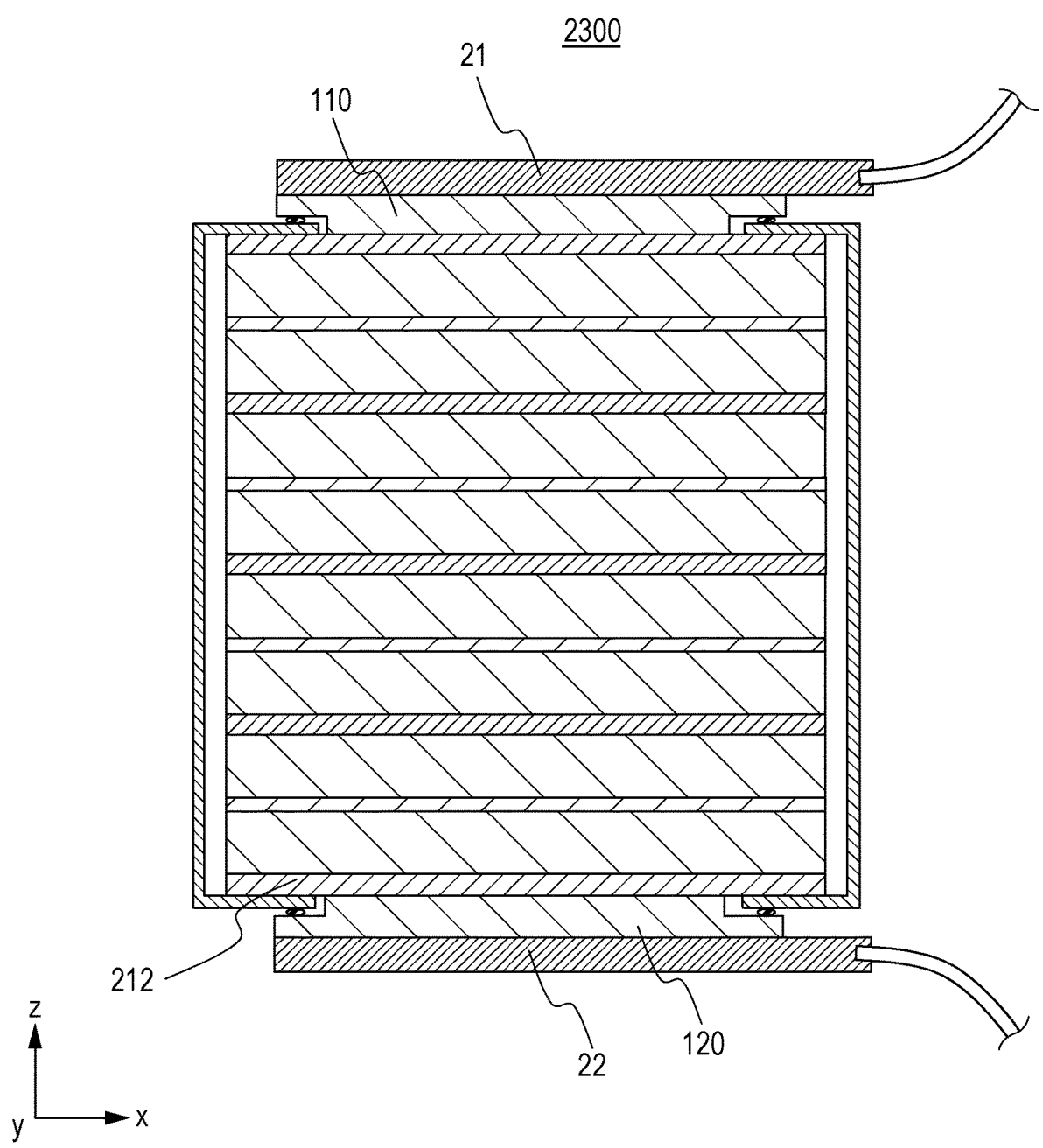
FIG. 11 is a cross-sectional view showing a schematic configuration of a battery in Embodiment 2.

FIG. 11 is a cross-sectional view showing a schematic configuration of a battery 2300 in Embodiment 2.

As shown in FIG. 11, a first planar electrode 110 may be connected to a terminal 21.

Furthermore, as shown in FIG. 11, a second planar electrode 120 may be connected to a terminal 22.

As described above, in the battery 2300 in Embodiment 2, the connecting object (second connecting object) of the second planar electrode 120 is a terminal.

The connecting object of the second planar electrode 120 may be a planar electrode or current collector of a battery to be stacked (as will be described later).

In Embodiment 2, the first planar electrode 110 may include a first joining portion 114 (e.g., connecting portion).

Furthermore, the second planar electrode 120 may include a second joining portion 124 (e.g., connecting portion).

The second joining portion 124 has a shape which can be joined to the first joining portion 114.

In the configuration described above, in the case where a plurality of batteries are connected to one another, the connections can be made firmer. More specifically, a first planar electrode 110 of one battery and a second planar electrode 120 of another battery can be more firmly connected to each other by joining a first joining portion 114 and a second joining portion 124 together. Accordingly, uniform surface contact between a first protruding surface 112 of the one battery and a second protruding surface 122 of the other battery can be more firmly maintained. Accordingly, the current density can be maintained uniformly between the one battery and the other battery. Because of this, the connection resistance value between the one battery and the other battery can be further decreased. Consequently, for example, even in the case where the plurality of batteries are charged and discharged with high current, it is possible to further reduce the occurrence of voltage loss, heat generation, or the like.

Figure 12:
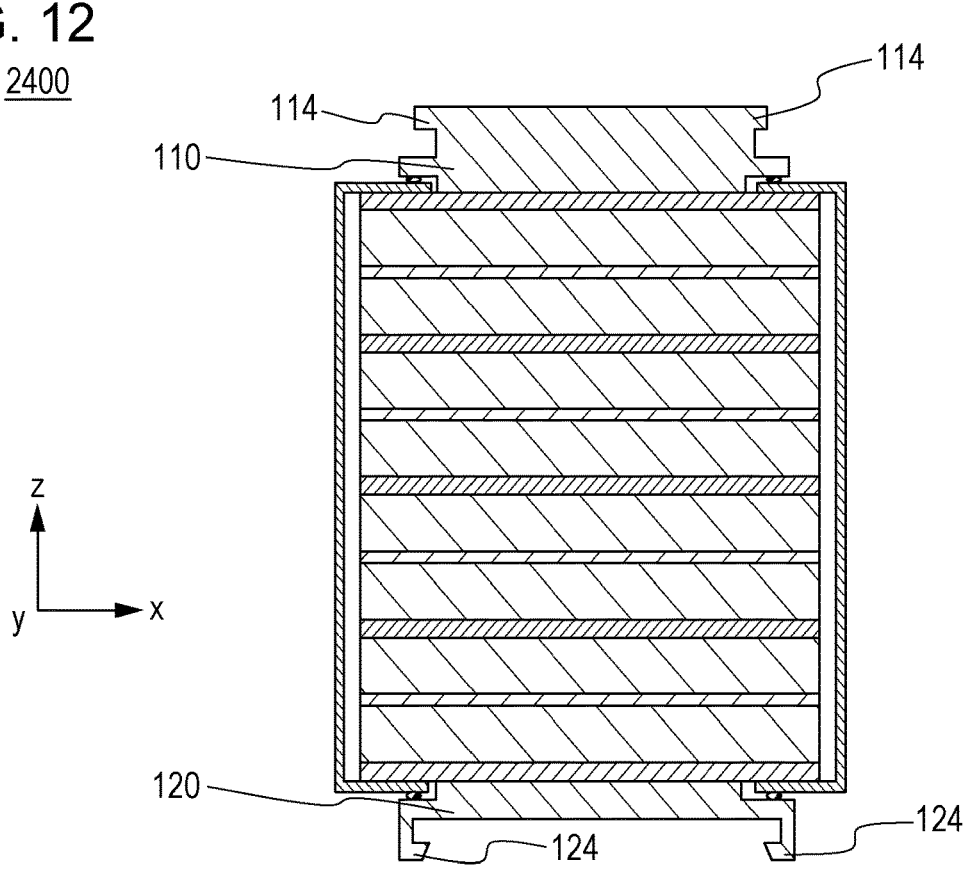
FIG. 12 is a cross-sectional view showing a schematic configuration of a battery in Embodiment 2.

FIG. 12 is a cross-sectional view showing a schematic configuration of a battery 2400 in Embodiment 2.

As shown in FIG. 12, a first joining portion 114 and a second joining portion 124 may constitute, as a pair, a snap-fit structure. In the snap-fit structure, a connection is fixed by pushing.

Figure 13:
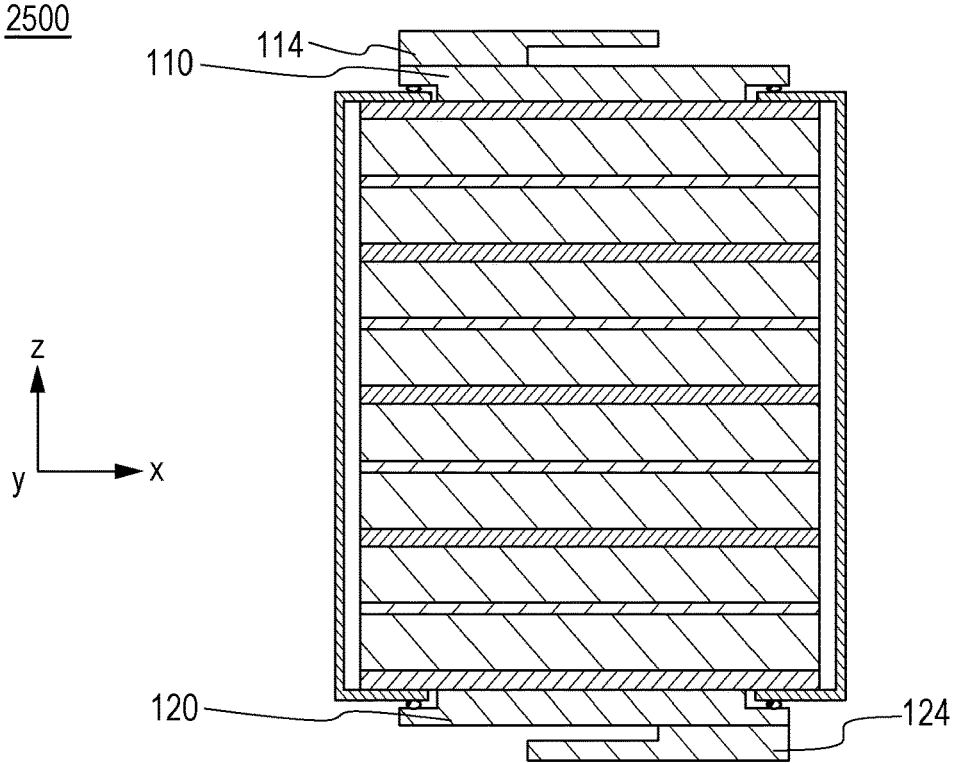
FIG. 13 is a cross-sectional view showing a schematic configuration of a battery in Embodiment 2.

FIG. 13 is a cross-sectional view showing a schematic configuration of a battery 2500 in Embodiment 2.

As shown in FIG. 13, a first joining portion 114 and a second joining portion 124 may constitute, as a pair, a hook structure. In the hook structure, a connection is fixed by hooking.

Figure 14:
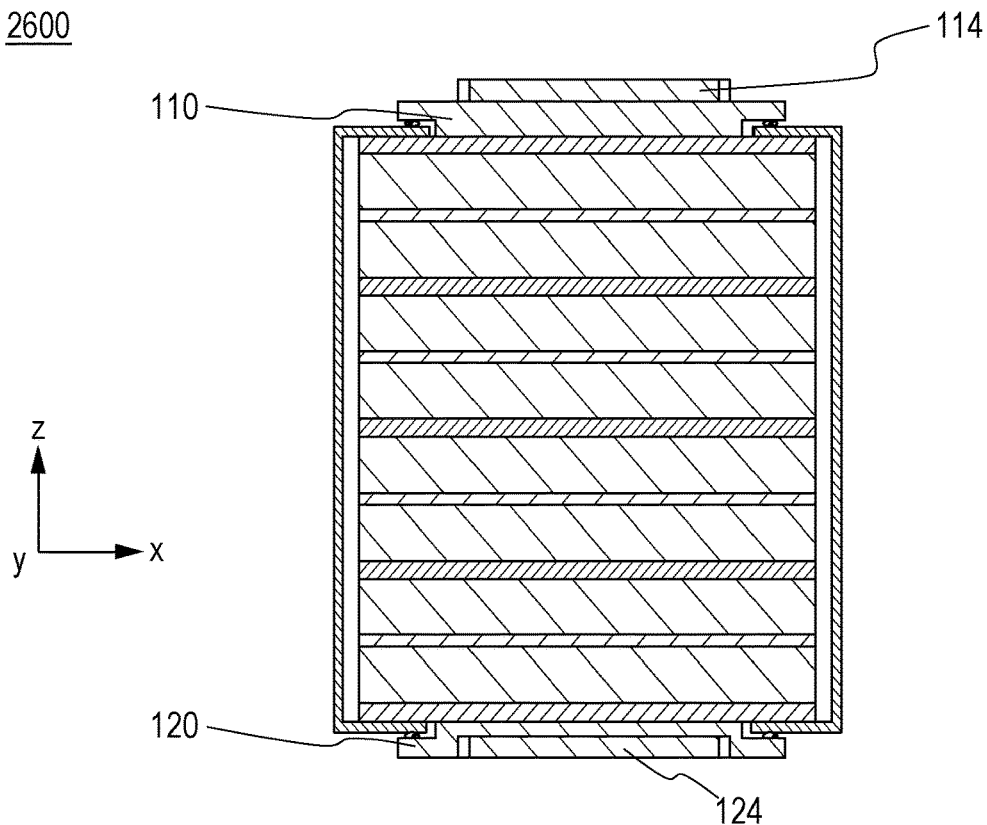
FIG. 14 is a cross-sectional view showing a schematic configuration of a battery in Embodiment 2.

FIG. 14 is a cross-sectional view showing a schematic configuration of a battery 2600 in Embodiment 2.

As shown in FIG. 14, a first joining portion 114 and a second joining portion 124 may constitute, as a pair, a screw-in structure. In the screw-in structure, a connection is fixed by rotation.

Figure 15:
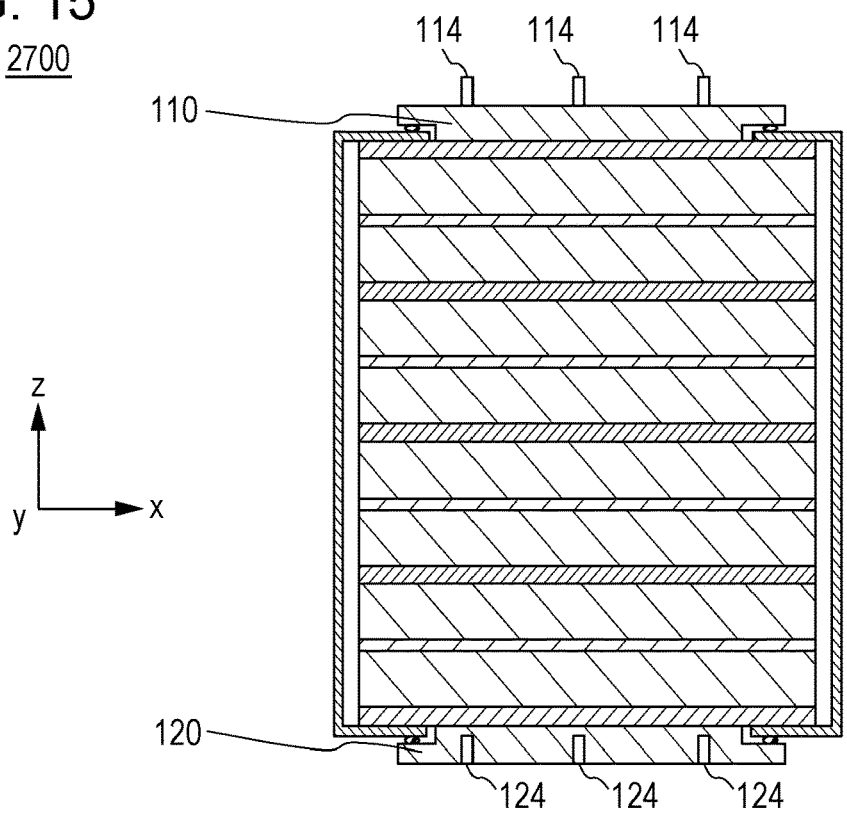
FIG. 15 is a cross-sectional view showing a schematic configuration of a battery in Embodiment 2.

FIG. 15 is a cross-sectional view showing a schematic configuration of a battery 2700 in Embodiment 2.

As shown in FIG. 15, a first joining portion 114 and a second joining portion 124 may constitute, as a pair, an insert pin structure. In the insert pin structure, a connection is fixed by insertion.

The structures of the joining portions described above are physical connection means for maintaining an electrical connection.

Furthermore, the joining portions each may be formed of a magnet. That is, the first joining portion 114 and the second joining portion 124 may be joined together by magnetic attraction of the magnets.

The structures of the joining portions described above can be used not only when a plurality of batteries are connected to one another, but also when an external terminal for wiring is connected to a battery.

Embodiment 3

Embodiment 3 will be described below. Descriptions that are duplicate of those in Embodiment 1 or 2 will be omitted appropriately.

Figure 16:
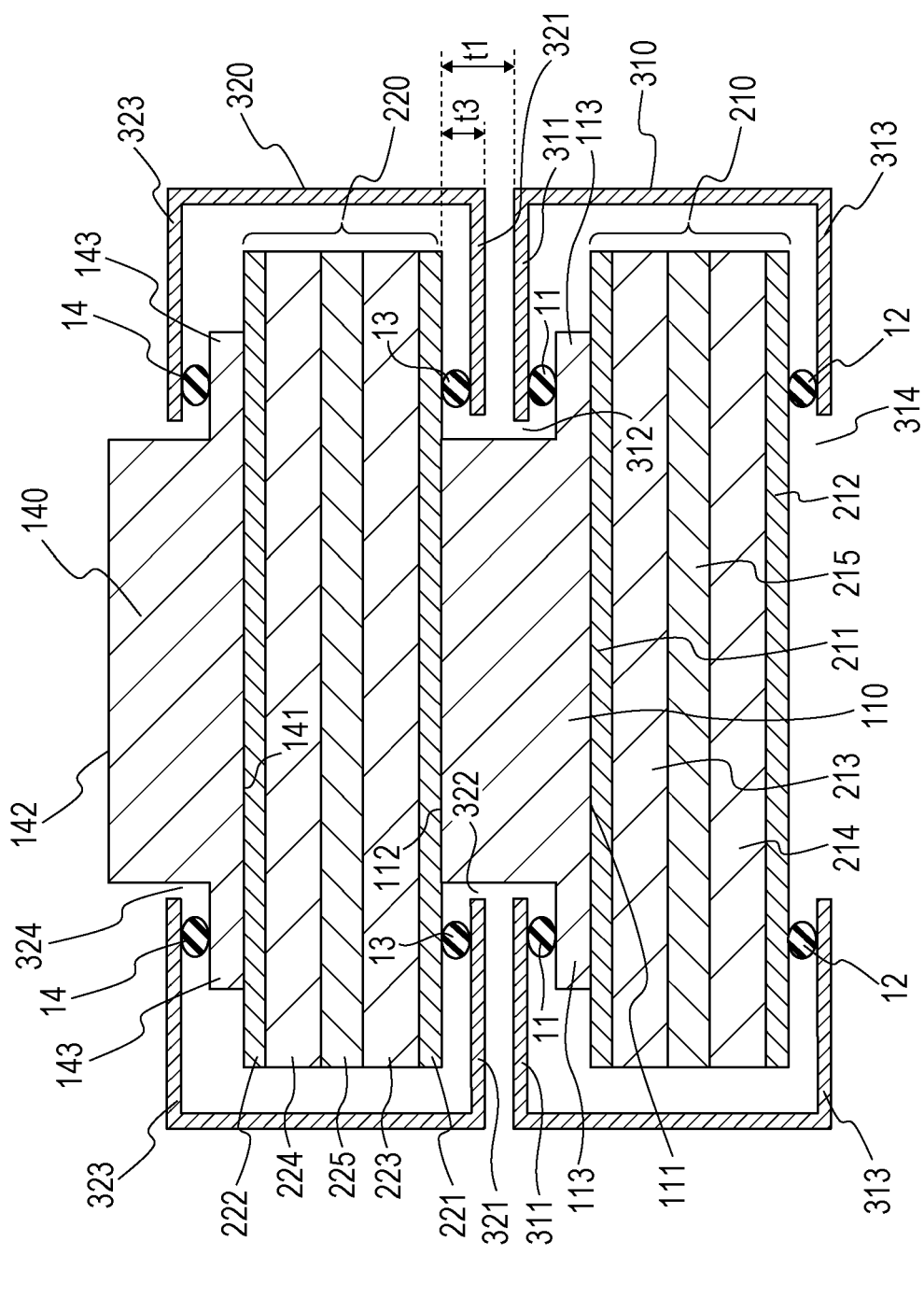
FIG. 16 is a cross-sectional view showing a schematic configuration of a battery in Embodiment 3.

FIG. 16 is a cross-sectional view showing a schematic configuration of a battery 3000 in Embodiment 3.

The battery 3000 in Embodiment 3 further includes the structure described below, in addition to the structure of the battery 1000 in Embodiment 1 or the structure of the battery 2000 in Embodiment 2.

That is, the battery 3000 in Embodiment 3 further includes a second power generation element 220 and a second outer cover body 320.

The second outer cover body 320 encloses the second power generation element 220.

The second outer cover body 320 includes a third covering portion 321.

The third covering portion 321 is provided with a third opening 322.

The first protruding surface 112 is inserted inside the second outer cover body 320 through the third opening 322.

The first protruding surface 112 is electrically connected to the second power generation element 220.

The distance (t1) between the first protruding surface 112 and the first covering portion 311 is equal to or larger than the distance (t3) between the third covering portion 321 and the second power generation element 220.

In the configuration described above, the first protruding surface 112 can be inserted inside the third covering portion 321 through the third opening 322. Therefore, the first protruding surface 112 and the second power generation element 220 can be connected more securely to each other. That is, for example, the first protruding surface 112 can be uniformly brought into surface contact with the second power generation element 220. Accordingly, the current density can be made uniform between the first planar electrode 110 and the second power generation element 220. Because of this, the connection resistance value between the first planar electrode 110 and the second power generation element 220 can be decreased. Consequently, for example, even in the case where the first power generation element 210 and the second power generation element 220 are charged and discharged with high current, it is possible to further reduce the occurrence of voltage loss, heat generation, or the like.

As shown in FIG. 16, in Embodiment 3, the second power generation element 220 may include a third current collector 221, a fourth current collector 222, a third active material layer 223, a fourth active material layer 224, and a second solid electrolyte layer 225.

The third active material layer 223 contains a third active material.

The fourth active material layer 224 contains a fourth active material.

The second solid electrolyte layer 225 contains a solid electrolyte.

The second solid electrolyte layer 225 is disposed between the third active material layer 223 and the fourth active material layer 224.

All-solid-state batteries are used with high current. Accordingly, in the case where the battery of Embodiment 3 is constructed in particular as an all-solid-state battery, the effect of securing a stable electrical connection can be more markedly obtained.

As materials for the layers of the second power generation element 220, the materials that can be used for the layers of the first power generation element 210 can be used.

Furthermore, the second power generation element 220 may be composed of the same materials as those of the first power generation element 210 and may have the same layer structure as that of the first power generation element 210.

Alternatively, the second power generation element 220 may be composed of materials different from those of the first power generation element 210 and may have a structure different from that of the first power generation element 210.

For example, in the case where the first active material layer 213 is a positive electrode active material layer, the third active material layer 223 is a negative electrode active material layer, the third current collector 221 is a negative electrode current collector, the fourth active material layer 224 is a positive electrode active material layer, and the fourth current collector 222 is a positive electrode current collector.

Furthermore, for example, in the case where the first active material layer 213 is a negative electrode active material layer, the third active material layer 223 is a positive electrode active material layer, the third current collector 221 is a positive electrode current collector, the fourth active material layer 224 is a negative electrode active material layer, and the fourth current collector 222 is a negative electrode current collector.

The material that can be used for the first outer cover body 310 can be used as a material for the second outer cover body 320.

Furthermore, the second outer cover body 320 and the first outer cover body 310 may be composed of the same material and may have the same shape.

Alternatively, the second outer cover body 320 and the first outer cover body 310 may be composed of different materials and may have different shapes.

Furthermore, as shown in FIG. 16, in the first planar electrode 110, the area of the first connecting surface 111 may be larger than the area of the first protruding surface 112.

In the configuration described above, it is possible to further increase the contact area between the first connecting surface 111 and the connecting portion (e.g., the first current collector 211) of the first power generation element 210.

Figure 17:
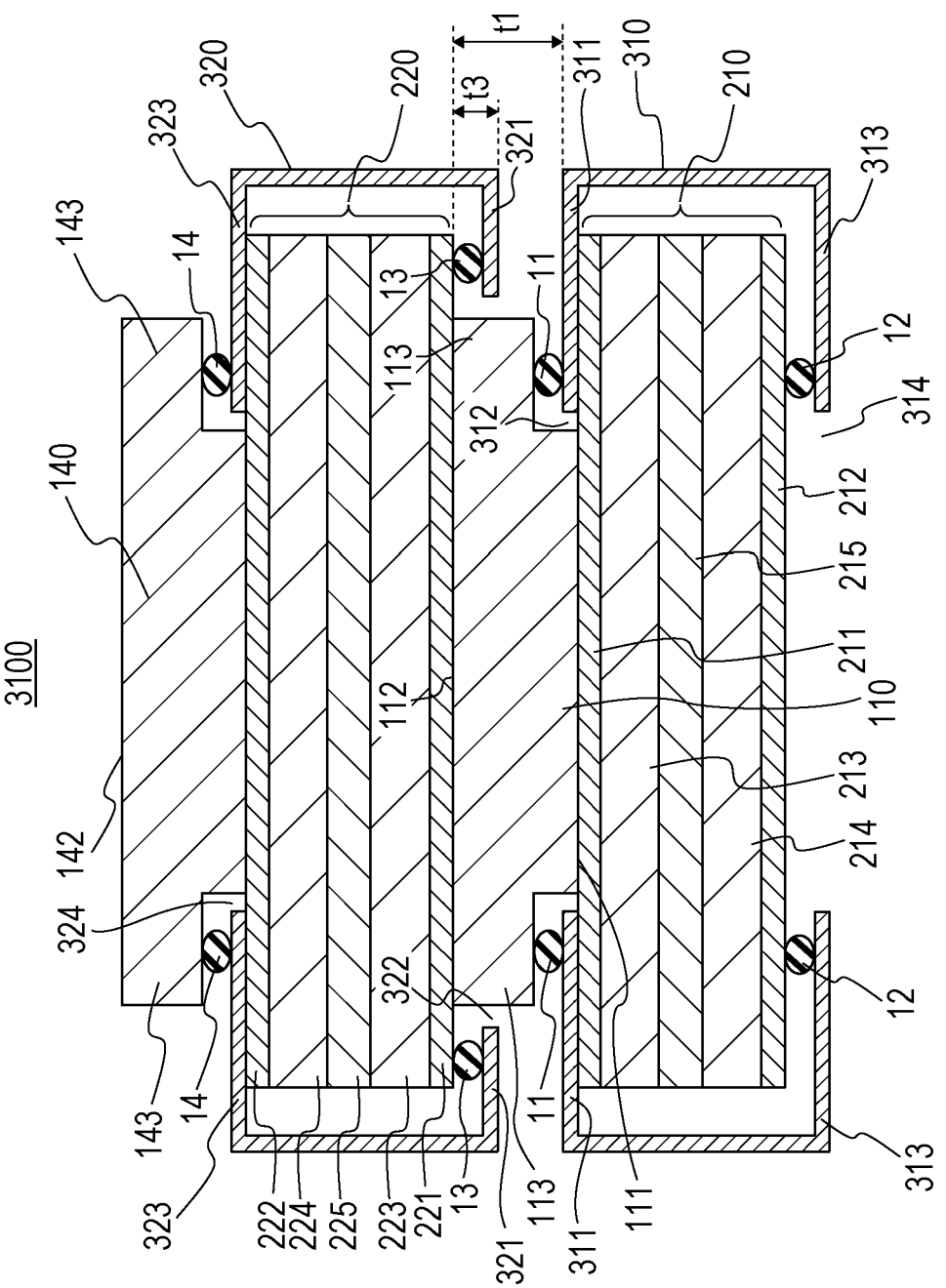
FIG. 17 is a cross-sectional view showing a schematic configuration of a battery in Embodiment 3.

FIG. 17 is a cross-sectional view showing a schematic configuration of a battery 3100 in Embodiment 3.

In the battery 3100 in Embodiment 3, in the first planar electrode 110, the area of the first protruding surface 112 is larger than the area of the first connecting surface 111.

In the configuration described above, it is possible to further increase the contact area between the first protruding surface 112 and the second power generation element 220 (e.g., a third current collector 221) which is a connecting object.

In Embodiment 3, the second power generation element 220 may include a third current collector 221.

In this case, the first protruding surface 112 may be in surface contact with a principal surface of the third current collector 221.

In the configuration described above, the first planar electrode 110 and the second power generation element 220 can be connected to each other with a larger contact area. Accordingly, the connection resistance value between the first planar electrode 110 and the second power generation element 220 can be further decreased. Consequently, for example, even in the case where the first power generation element 210 and the second power generation element 220 are charged and discharged with high current, it is possible to further reduce the occurrence of voltage loss, heat generation, or the like.

In Embodiment 3, the first protruding surface 112 and the third current collector 221 may be directly in surface contact with each other in the entire region (whole surface) where they face each other. Alternatively, another member (e.g., a member that enhances electrical conductivity or adhesiveness) may be partially disposed between the first protruding surface 112 and the third current collector 221. In this case, the first protruding surface 112 and the third current collector 221 may be directly in surface contact with each other in a region where the other member is not disposed.

In Embodiment 3, the first planar electrode 110 may serve as the third current collector 221. That is, the second power generation element 220 may not be provided with the third current collector 221. In this case, the first planar electrode 110 may be in surface contact with the third active material layer 223.

Figure 18:
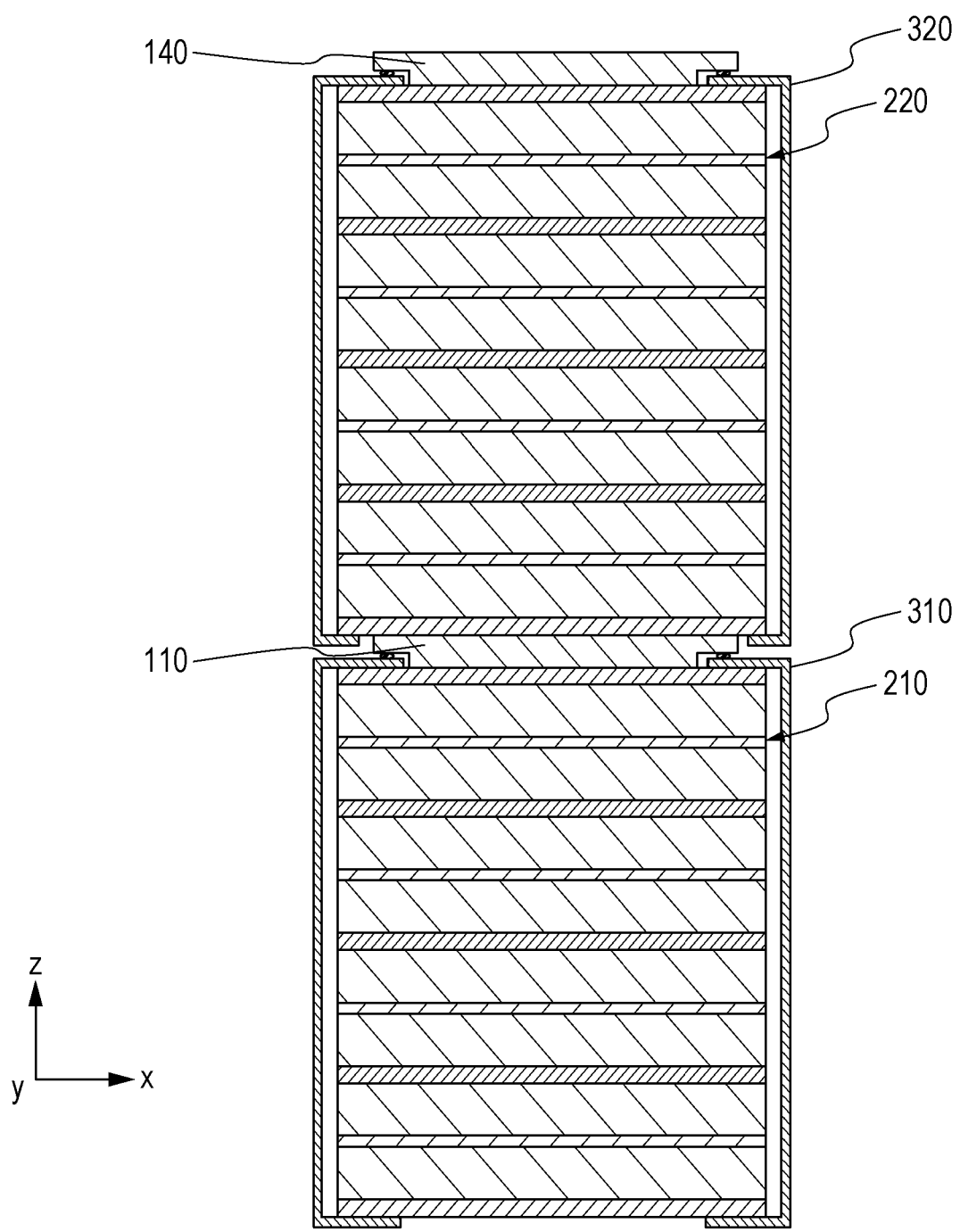
FIG. 18 is a cross-sectional view showing a schematic configuration of a battery in Embodiment 3.

FIG. 18 is a cross-sectional view showing a schematic configuration of a battery 3200 in Embodiment 3.

As shown in FIG. 18, the first power generation element 210 and the second power generation element 220 shown in each of FIGS. 16 and 17 may each have the configuration including a plurality of battery cells shown in FIG. 4.

Embodiment 4

Embodiment 4 will be described below. Descriptions that are duplicate of those in Embodiment 1, 2, or 3 will be omitted appropriately.

Figure 19:
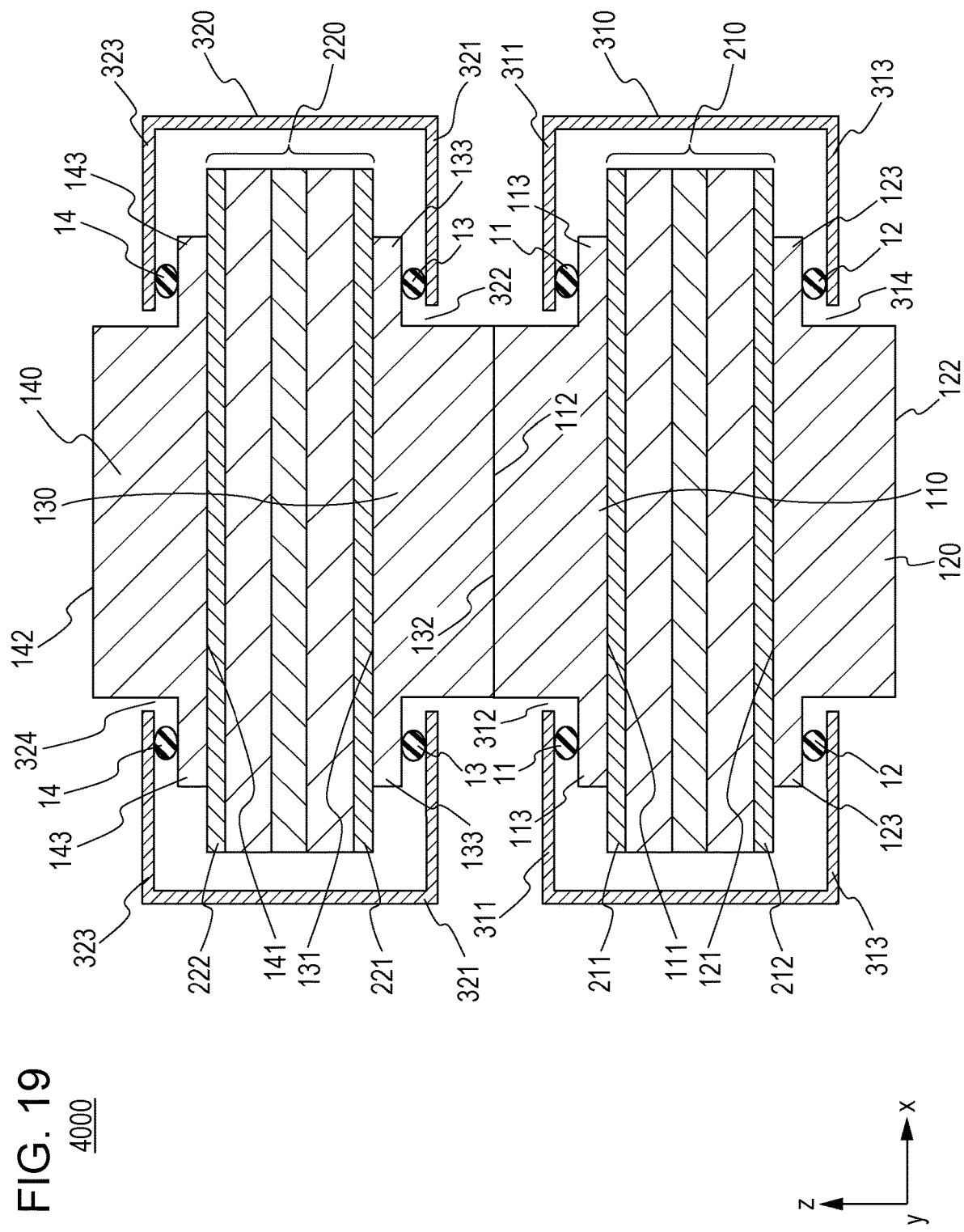
FIG. 19 is a cross-sectional view showing a schematic configuration of a battery in Embodiment 4.

FIG. 19 is a cross-sectional view showing a schematic configuration of a battery 4000 in Embodiment 4.

The battery 4000 in Embodiment 4 further includes the structure described below, in addition to the structure of the battery 1000 in Embodiment 1 or the structure of the battery 2000 in Embodiment 2.

That is, the battery 4000 in Embodiment 4 further includes a third planar electrode 130, a second power generation element 220, and a second outer cover body 320.

The second outer cover body 320 encloses the second power generation element 220.

The third planar electrode 130 has, as principal surfaces, a third connecting surface 131 and a third protruding surface 132.

The third protruding surface 132 is opposite the third connecting surface 131.

The third connecting surface 131 is electrically connected to the second power generation element 220.

The second outer cover body 320 includes a third covering portion 321.

The third covering portion 321 of the second outer cover body 320 is provided with a third opening 322.

The third protruding surface 132 protrudes from the third opening 322 toward the outside of the third covering portion 321.

The first protruding surface 112 is in surface contact with the third protruding surface 132.

In the configuration described above, the first power generation element 210 and the second power generation element 220 can be connected to each other with the first planar electrode 110 and the third planar electrode 130 therebetween. Therefore, first power generation element 210 and the second power generation element 220 can be connected more securely to each other. That is, the first protruding surface 112 can be uniformly brought into surface contact with the third protruding surface 132. Accordingly, the current density can be made uniform between the first planar electrode 110 and the third planar electrode 130. Because of this, the connection resistance value between the first planar electrode 110 and the third planar electrode 130 can be decreased. Consequently, for example, even in the case where the first power generation element 210 and the second power generation element 220 are charged and discharged with high current, it is possible to further reduce the occurrence of voltage loss, heat generation, or the like.

The material that can be used for the first planar electrode 110 can be used as a material for the third planar electrode 130.

Furthermore, the third planar electrode 130 and the first planar electrode 110 may be composed of the same material and may have the same shape.

Alternatively, the third planar electrode 130 and the first planar electrode 110 may be composed of different materials and may have different shapes.

The second power generation element 220 in Embodiment 4 can have the same structure as that of the second power generation element 220 in Embodiment 3.

Furthermore, the second outer cover body 320 in Embodiment 4 can have the same structure as that of the second outer cover body 320 in Embodiment 3.

Furthermore, as shown in FIG. 19, in the third planar electrode 130, the area of the third connecting surface 131 may be larger than the area of the third protruding surface 132.

In the configuration described above, it is possible to further increase the contact area between the third connecting surface 131 and a connecting portion (e.g., a third current collector 221) of the second power generation element 220.

Figure 20:
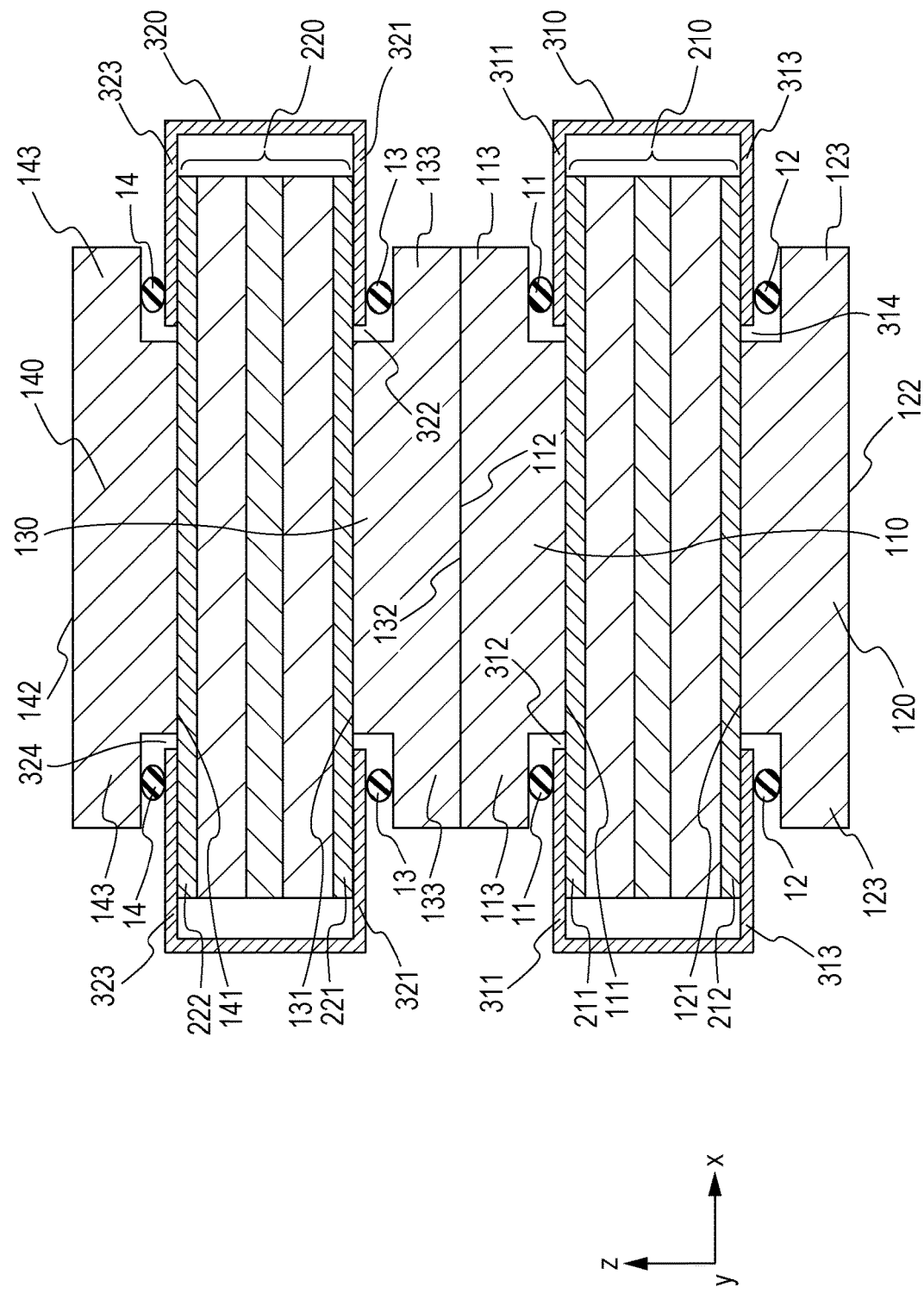
FIG. 20 is a cross-sectional view showing a schematic configuration of a battery in Embodiment 4.

FIG. 20 is a cross-sectional view showing a schematic configuration of a battery 4100 in Embodiment 4.

In the battery 4100 in Embodiment 4, in the third planar electrode 130, the area of the third protruding surface 132 is larger than the area of the third connecting surface 131.

In the configuration described above, it is possible to further increase the contact area between the third protruding surface 132 and the first protruding surface 112 which is a connecting object.

In the configuration examples shown in FIGS. 19 and 20, the third connecting surface 131 is in surface contact with the third current collector 221 of the second power generation element 220.

Furthermore, in the configuration examples shown in FIGS. 19 and 20, the third planar electrode 130 is arranged parallel to the third current collector 221.

The outside of the third covering portion 321 (i.e., the outside of the second outer cover body 320) means the side on which the second power generation element 220 is not placed. The inside of the third covering portion 321 (i.e., the inside of the second outer cover body 320) means the side on which the second power generation element 220 is placed.

In Embodiment 4, the third planar electrode 130 may include a third sealing end portion 133.

The third sealing end portion 133 is located so as to face the third covering portion 321.

A space between the third sealing end portion 133 and the third covering portion 321 is sealed.

In the configuration described above, it is possible to further increase the area of the sealing portion between the third planar electrode 130 and the second outer cover body 320. Consequently, it is possible to more firmly seal the space between the third planar electrode 130 and the second outer cover body 320. Furthermore, the third planar electrode 130 and the second outer cover body 320 can be held by each other more firmly. This can prevent occurrence of misalignment of the third planar electrode 130 and the like.

As shown in FIGS. 19 and 20, the space between the third sealing end portion 133 and the third covering portion 321 may be sealed with a third sealing portion 13.

In Embodiment 4, the first protruding surface 112 and the third protruding surface 132 may be directly in surface contact with each other in the entire region (whole surface) where they face each other. Alternatively, another member (e.g., a member that enhances electrical conductivity or adhesiveness) may be partially disposed between the first protruding surface 112 and the third protruding surface 132. In this case, the first protruding surface 112 and the third protruding surface 132 may be directly in surface contact with each other in a region where the other member is not disposed.

In the battery 4000 shown in FIG. 19, the third sealing portion 13 is located inside the second outer cover body 320.

Furthermore, in the battery 4100 shown in FIG. 20, the third sealing portion 13 is located outside the second outer cover body 320.

Furthermore, the third sealing portion 13 may join the third planar electrode 130 and the third covering portion 321 to each other around the entire periphery of the third opening 322 of the second outer cover body 320.

In the configuration described above, it is possible to further prevent the outside air from entering the second outer cover body 320 through the third opening 322.

The sealing method (connecting method) between the second outer cover body 320 and the third planar electrode 130 can be the same as the sealing method (connecting method) between the first outer cover body 310 and the first planar electrode 110.

In Embodiment 4, the second power generation element 220 may include a third current collector 221.

In this case, the third connecting surface 131 may be in surface contact with a principal surface of the third current collector 221.

In the configuration described above, the third planar electrode 130 and the second power generation element 220 can be connected to each other with a larger contact area. Accordingly, the connection resistance value between the third planar electrode 130 and the second power generation element 220 can be further decreased. Consequently, for example, even in the case where the first power generation element 210 and the second power generation element 220 are charged and discharged with high current, it is possible to further reduce the occurrence of voltage loss, heat generation, or the like.

In Embodiment 4, the third planar electrode 130 may serve as the third current collector 221. That is, the second power generation element 220 may not be provided with the third current collector 221. In this case, the third planar electrode 130 may be in surface contact with the third active material layer 223.

Figure 21:
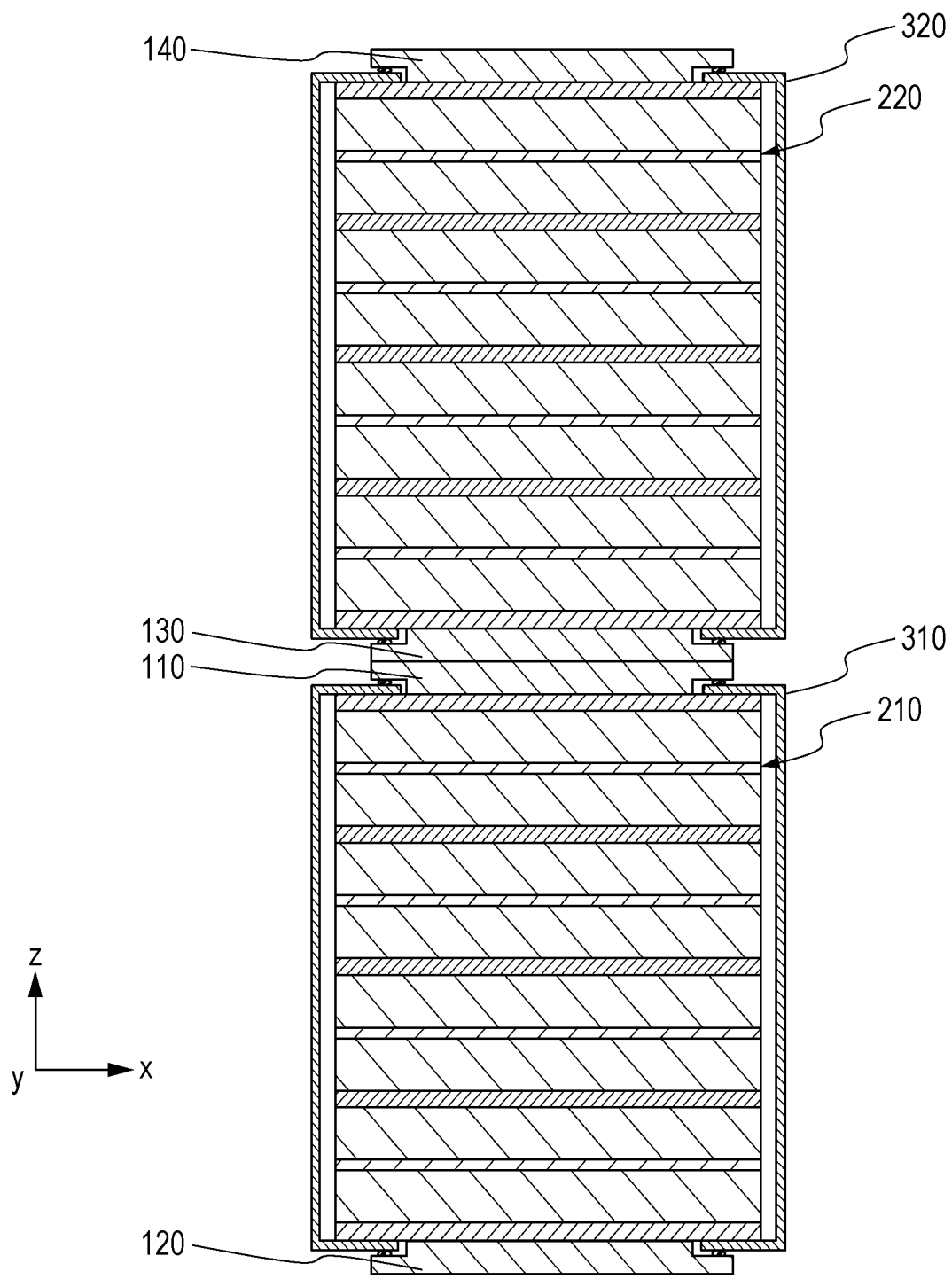
FIG. 21 is a cross-sectional view showing a schematic configuration of a battery in Embodiment 4.

FIG. 21 is a cross-sectional view showing a schematic configuration of a battery 4200 in Embodiment 4.

As shown in FIG. 21, the first power generation element 210 and the second power generation element 220 shown in each of FIGS. 19 and 20 may each have the configuration including a plurality of battery cells shown in FIG. 4.

In Embodiment 4, the first planar electrode 110 may include a first joining portion 114.

Furthermore, the third planar electrode 130 may include a third joining portion 134 (e.g., connecting portion).

The third joining portion 134 has a shape which can be joined to the first joining portion 114.

In this case, the first protruding surface 112 and the third protruding surface 132 are brought into surface contact with each other by joining the first joining portion 114 and the third joining portion 134 together.

In the configuration described above, the first planar electrode 110 and the third planar electrode 130 can be more firmly connected to each other. More specifically, the first planar electrode 110 and the third planar electrode 130 can be more firmly connected to each other by joining the first joining portion 114 and the third joining portion 134 together. Accordingly, uniform surface contact between the first protruding surface 112 and the third protruding surface 132 can be more firmly maintained. Accordingly, the current density can be maintained uniformly between the first planar electrode 110 and the third planar electrode 130. Because of this, the connection resistance value between the first planar electrode 110 and the third planar electrode 130 can be further decreased. Consequently, for example, even in the case where the first power generation element 210 and the second power generation element 220 are charged and discharged with high current, it is possible to further reduce the occurrence of voltage loss, heat generation, or the like.

Figure 22:
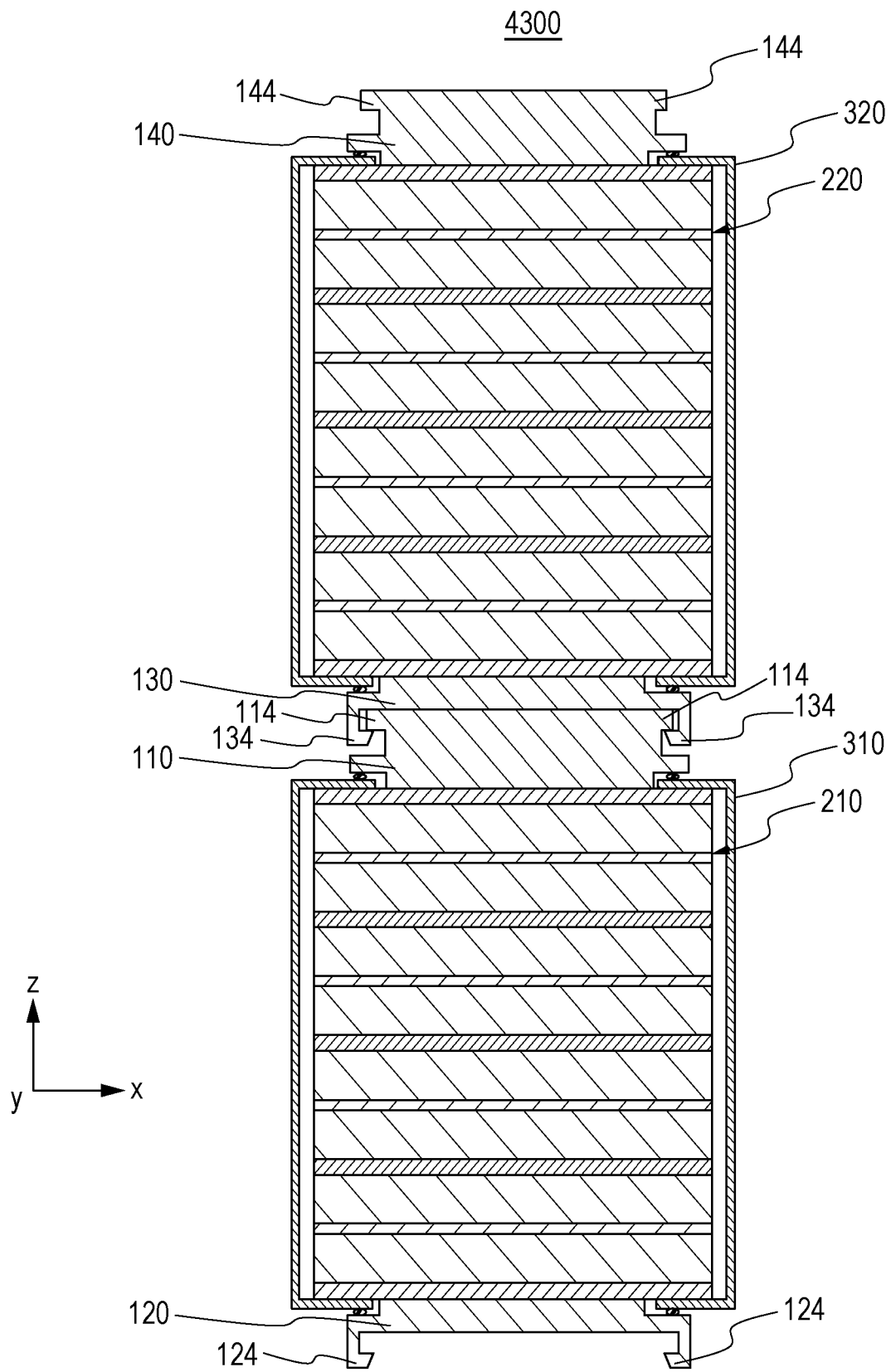
FIG. 22 is a cross-sectional view showing a schematic configuration of a battery in Embodiment 4.

FIG. 22 is a cross-sectional view showing a schematic configuration of a battery 4300 in Embodiment 4.

As shown in FIG. 22, a first joining portion 114 and a third joining portion 134 may constitute, as a pair, a snap-fit structure. In the snap-fit structure, a connection is fixed by pushing.

Figure 23:
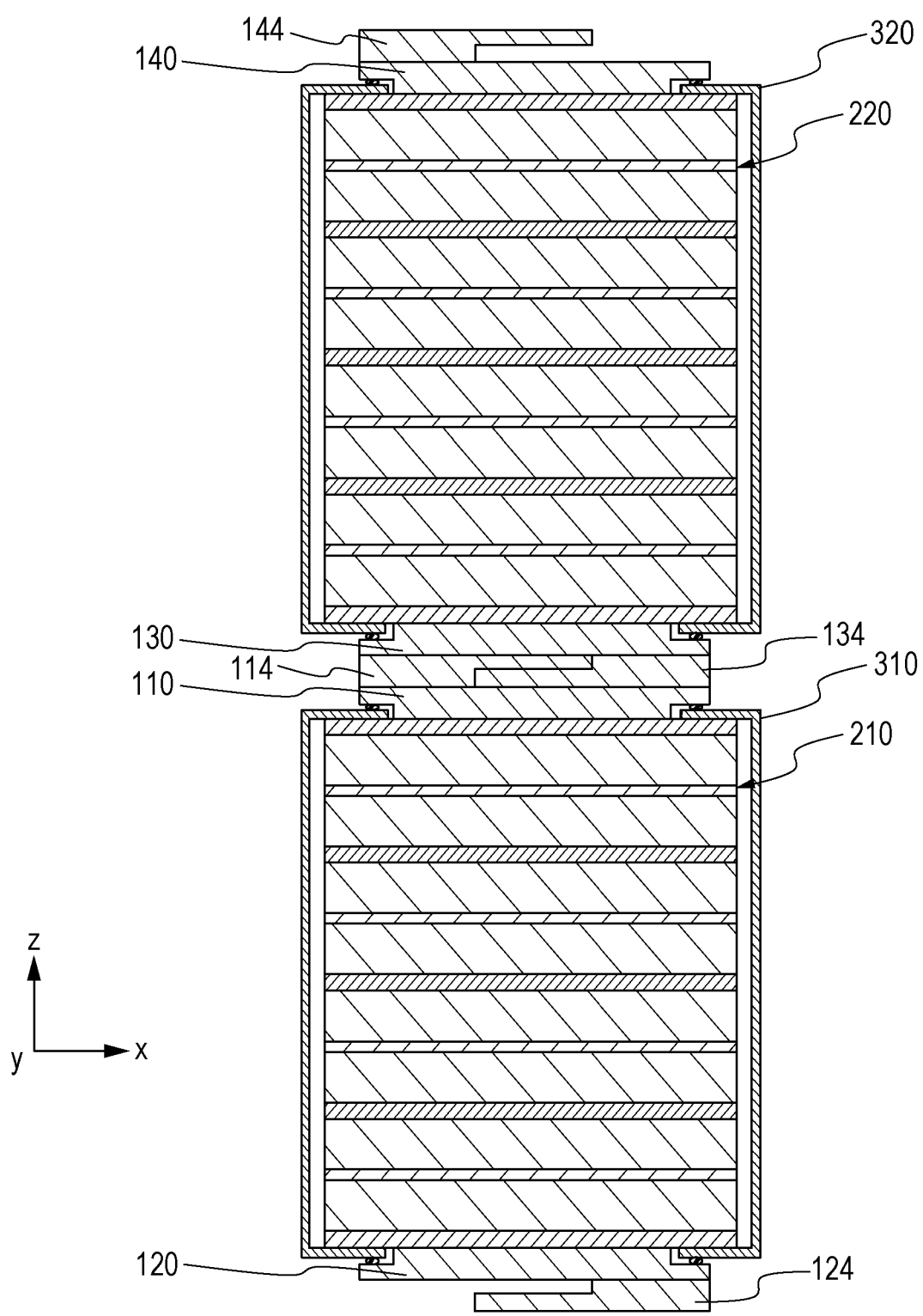
FIG. 23 is a cross-sectional view showing a schematic configuration of a battery in Embodiment 4.

FIG. 23 is a cross-sectional view showing a schematic configuration of a battery 4400 in Embodiment 4.

As shown in FIG. 23, a first joining portion 114 and a third joining portion 134 may constitute, as a pair, a hook structure. In the hook structure, a connection is fixed by hooking.

Figure 24:
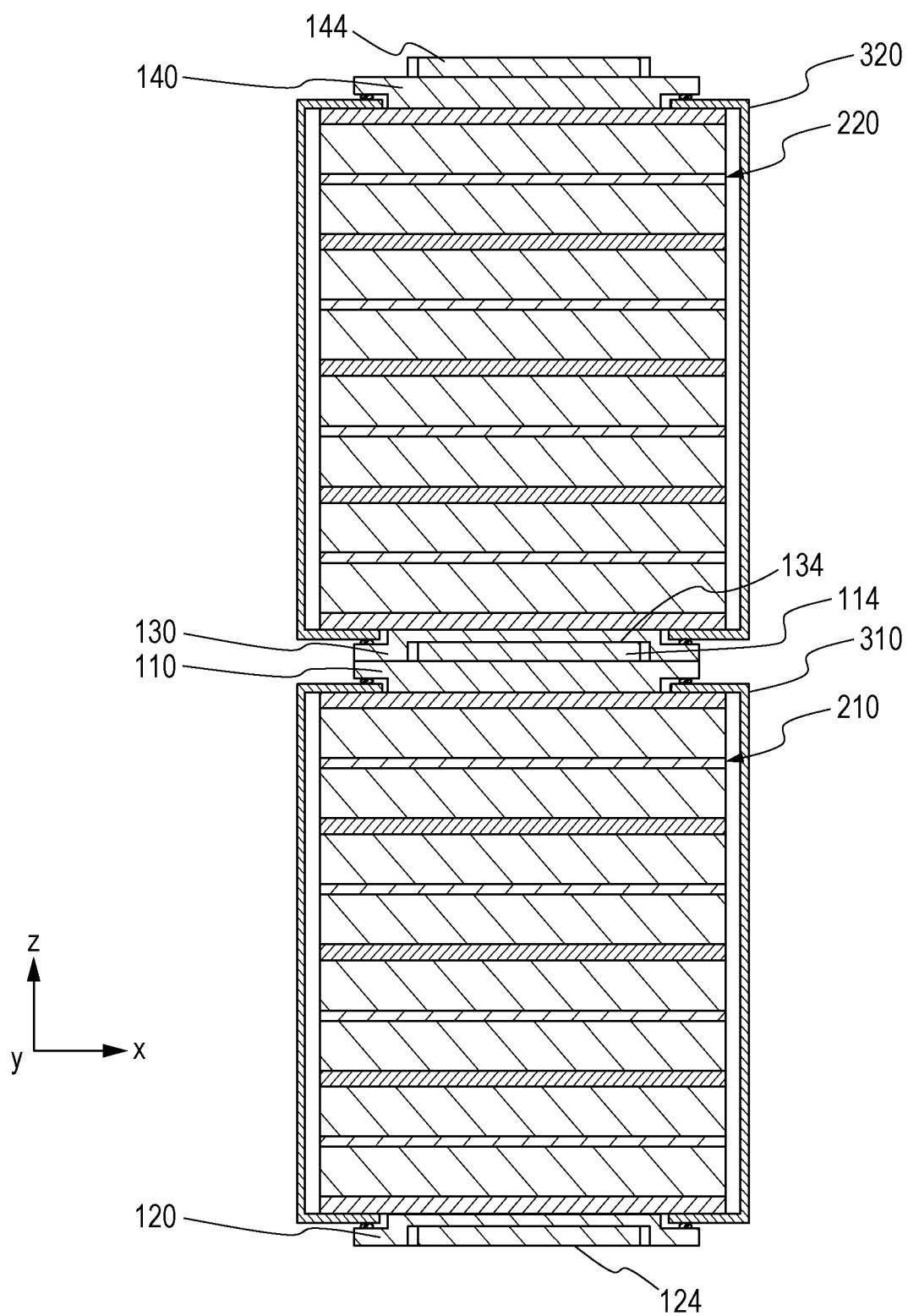
FIG. 24 is a cross-sectional view showing a schematic configuration of a battery in Embodiment 4.

FIG. 24 is a cross-sectional view showing a schematic configuration of a battery 4500 in Embodiment 4.

As shown in FIG. 24, a first joining portion 114 and a third joining portion 134 may constitute, as a pair, a screw-in structure. In the screw-in structure, a connection is fixed by rotation.

Figure 25:
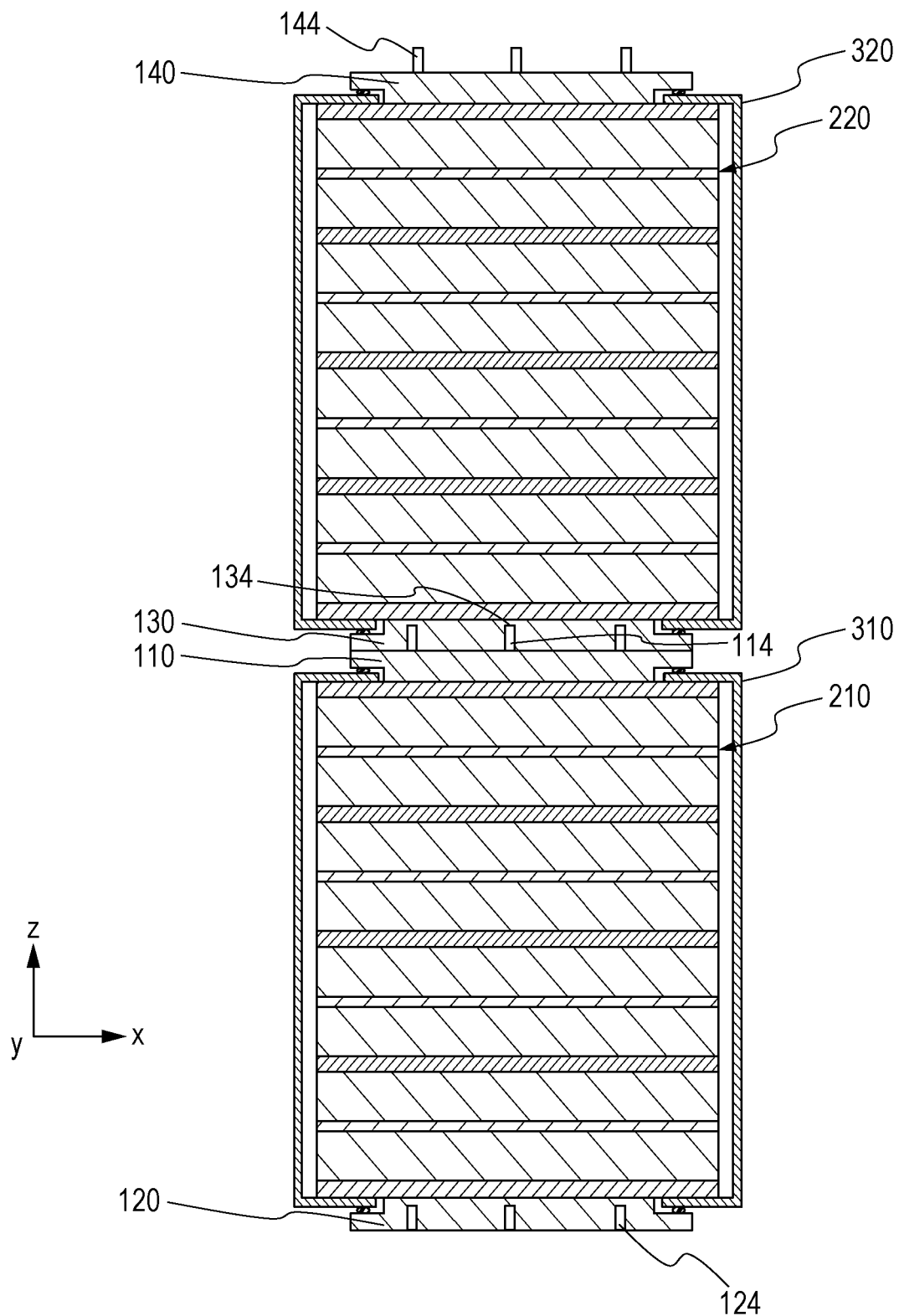
FIG. 25 is a cross-sectional view showing a schematic configuration of a battery in Embodiment 4.

FIG. 25 is a cross-sectional view showing a schematic configuration of a battery 4600 in Embodiment 4.

As shown in FIG. 25, a first joining portion 114 and a third joining portion 134 may constitute, as a pair, an insert pin structure. In the insert pin structure, a connection is fixed by insertion.

The structures of the joining portions described above are physical connection means for maintaining an electrical connection.

Furthermore, the joining portions each may be formed of a magnet. That is, the first joining portion 114 and the third joining portion 134 may be joined together by magnetic attraction of the magnets.

The structures of the joining portions described above can be used not only when a plurality of batteries are connected to one another, but also when an external terminal for wiring is connected to a battery.

In Embodiments 3 and 4, the second outer cover body 320 may include a fourth covering portion 323 provided with a fourth opening 324.

Furthermore, the battery in each of Embodiments 3 and 4 may include a fourth planar electrode 140 and a fourth sealing portion 14.

The fourth planar electrode 140 may have a fourth connecting surface 141, a fourth protruding surface 142, a fourth sealing end portion 143, and a fourth joining portion 144 (e.g., connecting portion).

The fourth planar electrode 140 may have the same structure as the first planar electrode 110. Accordingly, a detailed description thereof will be omitted.

Figure 26:
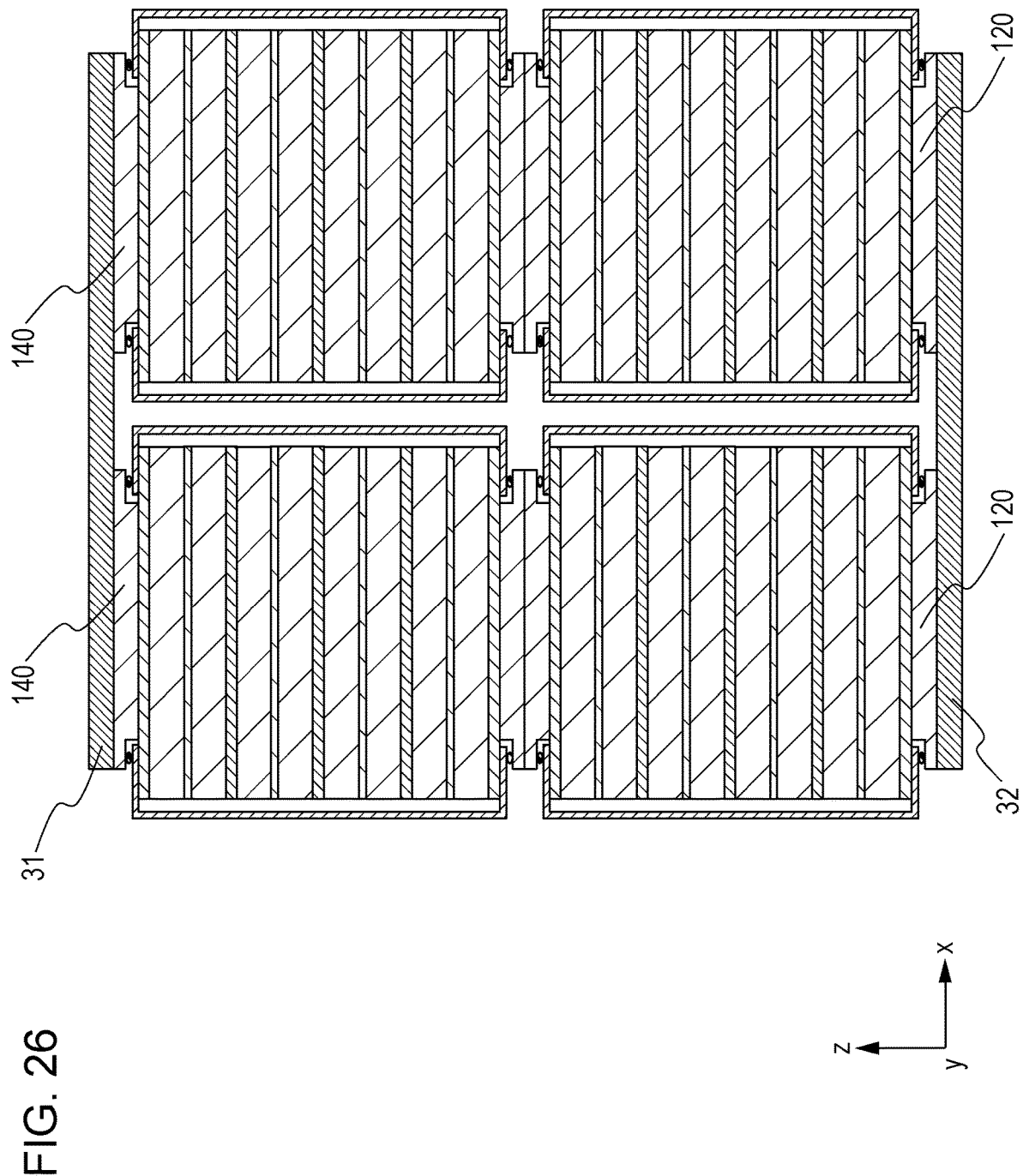
FIG. 26 is a cross-sectional view showing an example of use of a plurality of batteries.

FIG. 26 is a cross-sectional view showing an example of use of a plurality of batteries.

As shown in FIG. 26, two fourth planar electrodes 140 may be connected by a connecting member 31.

As shown in FIG. 26, two second planar electrodes 120 may be connected by a connecting member 32.

As shown in FIG. 26, regarding the batteries according to Embodiments 1 to 4, serial and parallel connections can be used in combination.

Furthermore, as in Embodiments 3 and 4, a plurality of power generation elements can be connected in series for use.

As described above, regarding the batteries according to Embodiments 1 to 4, a plurality of batteries can be easily connected and used. That is, the batteries according to Embodiments 1 to 4 include a battery electrode lead-out structure which is easy to handle, has excellent reliability, and is suitable for high-current use. Therefore, the batteries according to Embodiments 1 to 4 are easy to handle, have excellent reliability, and are suitable for high-current use. In the batteries according to Embodiments 1 to 4, when connected to a terminal, or in particular when a plurality of batteries are connected and used, the effect can be markedly obtained.

The present disclosure can be suitably used, for example, for various electronic devices, electric appliances, and electric vehicles which require ease in handling, reliability, high-current characteristics, or the like.

What is claimed is:

1. A battery comprising:
a first power generation element;
a first outer cover body which encloses the first power generation element; and
a first planar electrode having, as principal surfaces, a first connecting surface and a first protruding surface opposite the first connecting surface, a majority of the first connecting surface directly contacts a surface of the first power generation element,
wherein the first connecting surface is electrically connected to the first power generation element,
the first outer cover body includes a first covering portion provided with a first opening,
the first protruding surface protrudes from the first opening toward an outside of the first covering portion, the first protruding surface of the first planar electrode is positioned higher than an upper surface of the first outer cover body,
the first covering portion is joined to at least one of the first planar electrode and the first power generation element,
the first planar electrode includes a first sealing end portion,
the first sealing end portion faces the first covering portion, and
a space between the first sealing end portion and the first covering portion is sealed.

2. The battery according to claim 1, wherein the first power generation element includes a first current collector, and
the first connecting surface is in surface contact with a principal surface of the first current collector.

3. The battery according to claim 1, wherein the first outer cover body includes a second covering portion provided with a second opening, and
a distance between the first protruding surface and the first covering portion is equal to or larger than a distance between the second covering portion and the first power generation element.

4. The battery according to claim 1, further comprising a second planar electrode having, as principal surfaces, a second connecting surface and a second protruding surface opposite the second connecting surface,
wherein the first connecting surface is electrically connected to one electrode of the first power generation element,
the second connecting surface is electrically connected to another electrode of the first power generation element,
the first outer cover body includes a second covering portion provided with a second opening, and
the second protruding surface protrudes from the second opening toward an outside of the second covering portion.

5. The battery according to claim 4, wherein the second planar electrode includes a second sealing end portion,
the second sealing end portion faces the second covering portion, and
a space between the second sealing end portion and the second covering portion is sealed.

6. The battery according to claim 4, wherein the first power generation element includes a second current collector, and
the second connecting surface is in surface contact with a principal surface of the second current collector.

7. The battery according to claim 4, wherein the first planar electrode includes a first joining portion,
the second planar electrode includes a second joining portion, and
the second joining portion has a shape which is joined to the first joining portion.

8. The battery according to claim 1, wherein the first power generation element includes a first active material layer containing a first active material, a second active material layer containing a second active material, and a first solid electrolyte layer containing a solid electrolyte, and
the first solid electrolyte layer is disposed between the first active material layer and the second active material layer.

9. The battery according to claim 1, further comprising:
a second power generation element; and
a second outer cover body which encloses the second power generation element,
wherein the second outer cover body includes a third covering portion provided with a third opening,
the first protruding surface is inserted inside the second outer cover body through the third opening,
the first protruding surface is electrically connected to the second power generation element, and
a distance between the first protruding surface and the first covering portion is equal to or larger than a distance between the third covering portion and the second power generation element.

10. The battery according to claim 9, wherein the second power generation element includes a third current collector, and
the first protruding surface is in surface contact with a principal surface of the third current collector.

11. The battery according to claim 9, wherein the second power generation element includes a third active material layer containing a third active material layer, a fourth active material layer containing a fourth active material,
and a second solid electrolyte layer containing a solid electrolyte, and
the second solid electrolyte layer is disposed between the third active material layer and the fourth active material layer.

12. The battery according to claim 1, further comprising:
a second power generation element;
a second outer cover body which encloses the second power generation element; and
a third planar electrode having, as principal surfaces, a third connecting surface and a third protruding surface opposite the third connecting surface,
wherein the third connecting surface is electrically connected to the second power generation element,
the second outer cover body includes a third covering portion provided with a third opening,
the third protruding surface protrudes from the third opening toward an outside of the third covering portion, and
the first protruding surface is in surface contact with the third protruding surface.

13. The battery according to claim 12, wherein the third planar electrode includes a third sealing end portion,
   the third sealing end portion faces the third covering portion, and
   a space between the third sealing end portion and the third covering portion is sealed.

14. The battery according to claim 12, wherein the second power generation element includes a third current collector, and
   the third connecting surface is in surface contact with a principal surface of the third current collector.

15. The battery according to claim 12, wherein the first planar electrode includes a first joining portion,
   the third planar electrode includes a third joining portion,
   the third joining portion has a shape which is joined to the first joining portion, and
   the first protruding surface and the third protruding surface are brought into surface contact with each other by joining the first joining portion and the third joining portion together.

16. The battery according to claim 1, wherein the first planar electrode has a uniform composition.

17. The battery according to claim 1, wherein the area of the first connecting surface is equal to or greater than the area of the first protruding surface.

18. The battery according to claim 1, wherein the entire first connecting surface directly contacts the surface of the first power generation element.

19. The battery according to claim 1, wherein the first connecting surface is a single planar surface.

\* \* \* \* \*